(12) United States Patent
Toyama

(10) Patent No.: US 7,085,069 B2
(45) Date of Patent: Aug. 1, 2006

(54) LARGE ZOOM RATIO ZOOM LENS

(75) Inventor: Nobuaki Toyama, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/045,349

(22) Filed: Jan. 31, 2005

(65) Prior Publication Data

US 2005/0180024 A1 Aug. 18, 2005

(30) Foreign Application Priority Data

Feb. 12, 2004 (JP) ............... 2004-035334

(51) Int. Cl.
*G02B 15/14* (2006.01)
(52) U.S. Cl. ............... 359/684; 359/686; 359/687
(58) Field of Classification Search ............... 359/683, 359/684, 686–688
See application file for complete search history.

(56) References Cited

U.S. PATENT DOCUMENTS

| | | | | |
|---|---|---|---|---|
| 5,966,246 A | * | 10/1999 | Yoshikawa | 359/686 |
| 6,278,559 B1 | * | 8/2001 | Yahagi | 359/683 |
| 6,545,818 B1 | * | 4/2003 | Usui et al. | 359/686 |

FOREIGN PATENT DOCUMENTS

| | | |
|---|---|---|
| JP | 2001-116993 | 4/2001 |
| JP | 3376177 | 11/2002 |

OTHER PUBLICATIONS discussed at page 2 of spec; English Abstract attached.

* cited by examiner

*Primary Examiner*—Scott J. Sugarman
*Assistant Examiner*—William Choi
(74) *Attorney, Agent, or Firm*—Arnold International; Jon W. Henry; Bruce Y. Arnold

(57) ABSTRACT

A large zoom ratio zoom lens includes four lens groups, a first lens group of positive refractive power, a second lens group of negative refractive power, a third lens group, and a fourth lens group of positive refractive power. The second and third lens groups move for zooming. The first lens group includes, from the object side, a fixed lens subgroup of negative refractive power, a lens subgroup of positive refractive power that moves for focusing adjustment, and a fixed lens subgroup of positive refractive power. The lens subgroup that moves for focusing includes a lens element of negative refractive power on its object side and two lens elements of positive refractive power. To suppress aberrations, specified conditions related to radii of curvature of lens elements and various internal focal lengths are satisfied. The zoom lens also minimizes fluctuations in the angle of view at the wide-angle end during focusing.

20 Claims, 10 Drawing Sheets

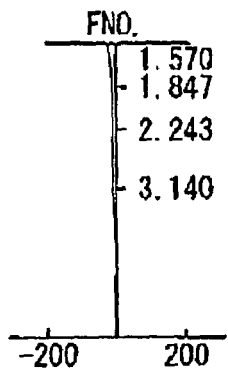
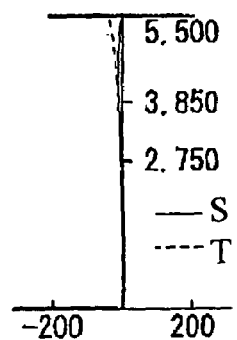
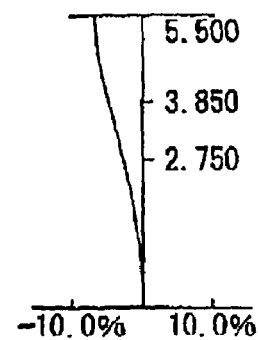
Spherical Aberration
Fig. 4A
Astigmatism
Fig. 4B
Distortion
Fig. 4C
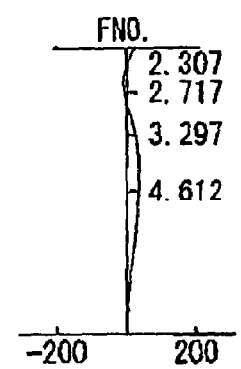
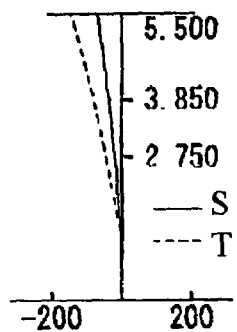
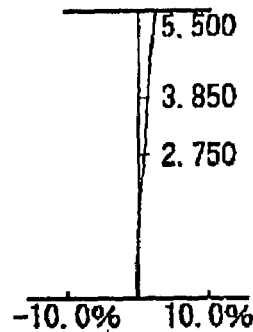
Spherical Aberration
Fig. 5A
Astigmatism
Fig. 5B
Distortion
Fig. 5C Spherical Aberration Astigmatism Distortion Spherical Aberration Astigmatism Distortion Spherical Aberration Astigmatism Distortion Spherical Aberration Astigmatism Distortion Spherical Aberration Astigmatism Distortion Spherical Aberration Astigmatism Distortion Spherical Aberration Astigmatism Distortion Spherical Aberration Astigmatism Distortion Spherical Aberration Astigmatism Distortion Spherical Aberration Astigmatism Distortion Spherical Aberration Astigmatism Distortion Spherical Aberration Astigmatism Distortion

LARGE ZOOM RATIO ZOOM LENS

FIELD OF THE INVENTION

The present invention relates to a small zoom lens having a high zoom ratio, for example, a zoom ratio of about 26, that is suitable for a highly efficient camera for television broadcasting, for video recording, or for similar devices. The present invention further relates particularly to a zoom lens that minimizes fluctuations in the angle of view and fluctuations in various aberrations during focusing.

BACKGROUND OF THE INVENTION

Four-group zoom lenses for use in television broadcast cameras and in cameras for video recording are known. One known type of four-group zoom lens, for example, includes, in order from the object side; a first group having positive refractive power; a second group having negative refractive power; a third group having positive or negative refractive power; and a fourth group having positive refractive power. In this known type of four-group zoom lens, zooming is performed by moving the second group and the third group along the optical axis.

In addition, there has been a demand in recent years for a small zoom lens that has a high zoom ratio but that is highly efficient as the imaging optics of a television camera or a similar imaging device. This demand has been accompanied by a demand that the small zoom lens provide a wider angle of view. However, in order to achieve a wider angle with a high zoom ratio while maintaining high efficiency, because the peripheral light rays greatly deviate from the optical axis, especially at the wide-angle end, the front (object-side) lens element is required to be larger, which results in increasing the weight of the zoom lens, particularly the weight of the zoom lens at its front (object-side) end. This tends to make the zoom lens difficult to handle both in terms of total weight and poor balance with too much weight at the front (object-side) end of the zoom lens. Additionally, when the angle of view (field angle) of the zoom lens is increased, fluctuations in the angle of view (field angle) and fluctuations in various aberrations increase during focusing of the zoom lens. In particular, fluctuations in the angle of view (field angle) during focusing are especially noticeable at the wide-angle end even if the fluctuations are the same at the wide-angle end and the telephoto end.

In order to alleviate these problems, a so-called inner focus system for zoom lenses has been proposed. In this inner focus system, the lens group on the object side of the zoom lens includes, arranged in order from the object side of the zoom lens along an optical axis; a first lens subgroup having negative refractive power; a second lens subgroup having positive refractive power; and a third lens subgroup having positive refractive power, with focusing being performed by moving the second lens subgroup along the optical axis. This inner focus system for a zoom lens, as compared to other known systems where focusing is performed by moving the entire object-side lens group, has some advantages in keeping the effective aperture of the object-side lens group small, in assisting in reducing the size of the zoom lens, in reducing the force required to drive the lens groups of the zoom lens, and thus in assisting in achieving rapid focusing of the zoom lens. Additionally, the fluctuation in the angle of view (field angle) during focusing is small compared to other focus systems for zoom lenses.

Japanese Laid-Open Patent Application 2001-116993 and Japanese Patent 3376177 disclose zoom lenses using inner focus systems as described above. Japanese Laid-Open Patent Application 2001-116993 discloses a zoom lens with a zoom ratio in the range of 8 to 15, with an f-number of about 1.65 at the wide-angle end, and that is intended to be small and compact as well as highly efficient. Japanese Patent 3376177 discloses a zoom lens with a zoom ratio in the range of 10 to 30, with an f-number in the range of about 1.5 to 1.8 at the wide-angle end, and that is intended to be small and highly efficient. In the zoom lenses described in Japanese Laid-Open Patent Application 2001-116993 and Japanese Patent 3376177, in the first lens group from the object side of the zoom lens, the second lens subgroup from the object side, which is the first lens subgroup from the object side having positive refractive power, is preceded on the object side by a lens component having positive refractive power, which is part of the object-side lens group that has negative refractive power overall.

BRIEF SUMMARY OF THE INVENTION

The present invention relates to a small zoom lens of the inner-focus type that provides high efficiency, a large zoom ratio, and that reduces fluctuations in the angle of view (field angle) and fluctuations in various aberrations during focusing of the zoom lens.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4B show the spherical aberration, astigmatism, and distortion, respectively, of the zoom lens according to Embodiment 1 at the wide-angle end;

FIGS. 5A–5C show the spherical aberration, astigmatism, and distortion, respectively, of the zoom lens according to Embodiment 1 at the telephoto end;

DETAILED DESCRIPTION

Figure 1:
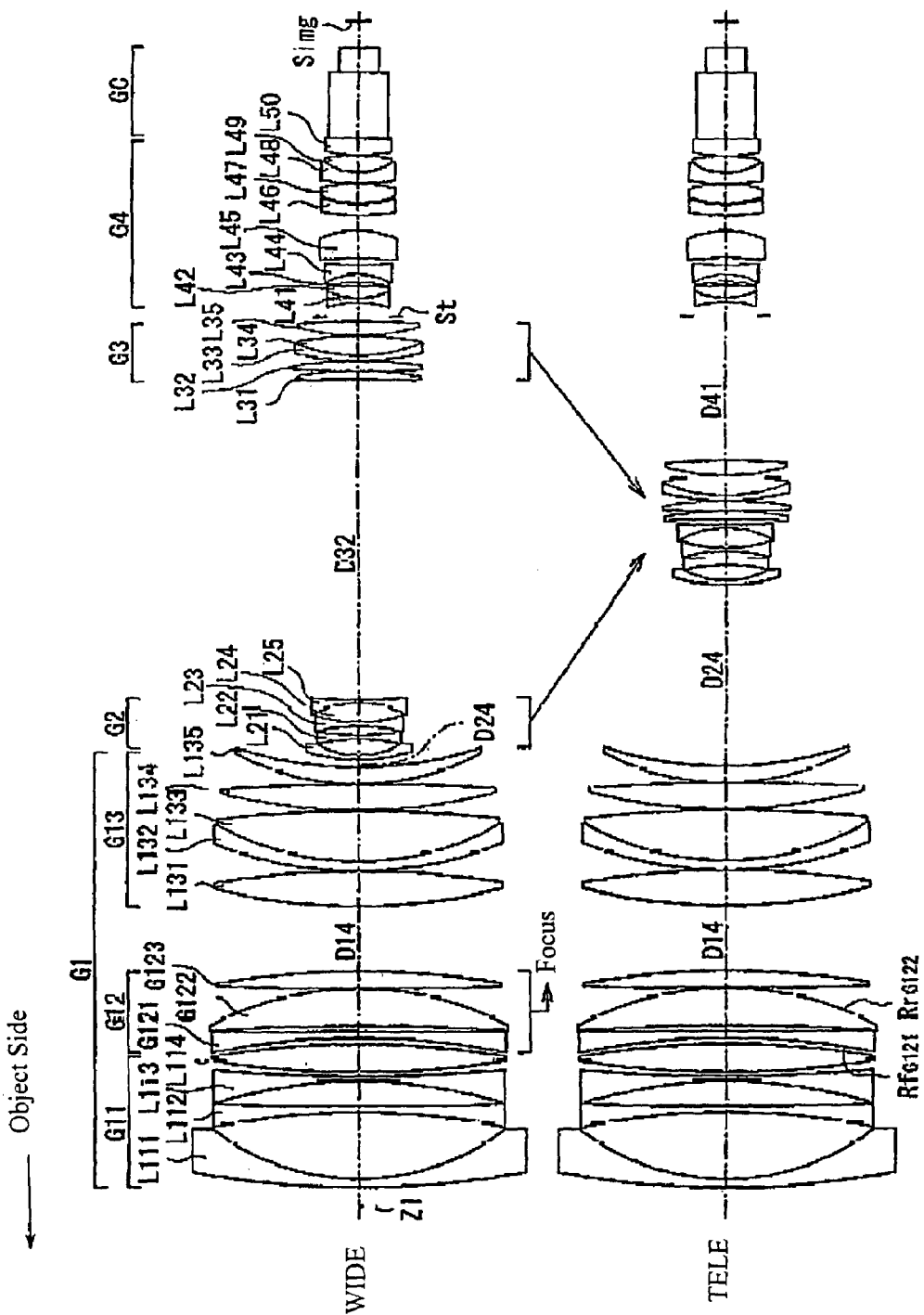
FIG. 1 shows cross-sectional views of Embodiment 1 of the present invention at the wide-angle end (WIDE) and at the telephoto end (TELE)
Figure 2:
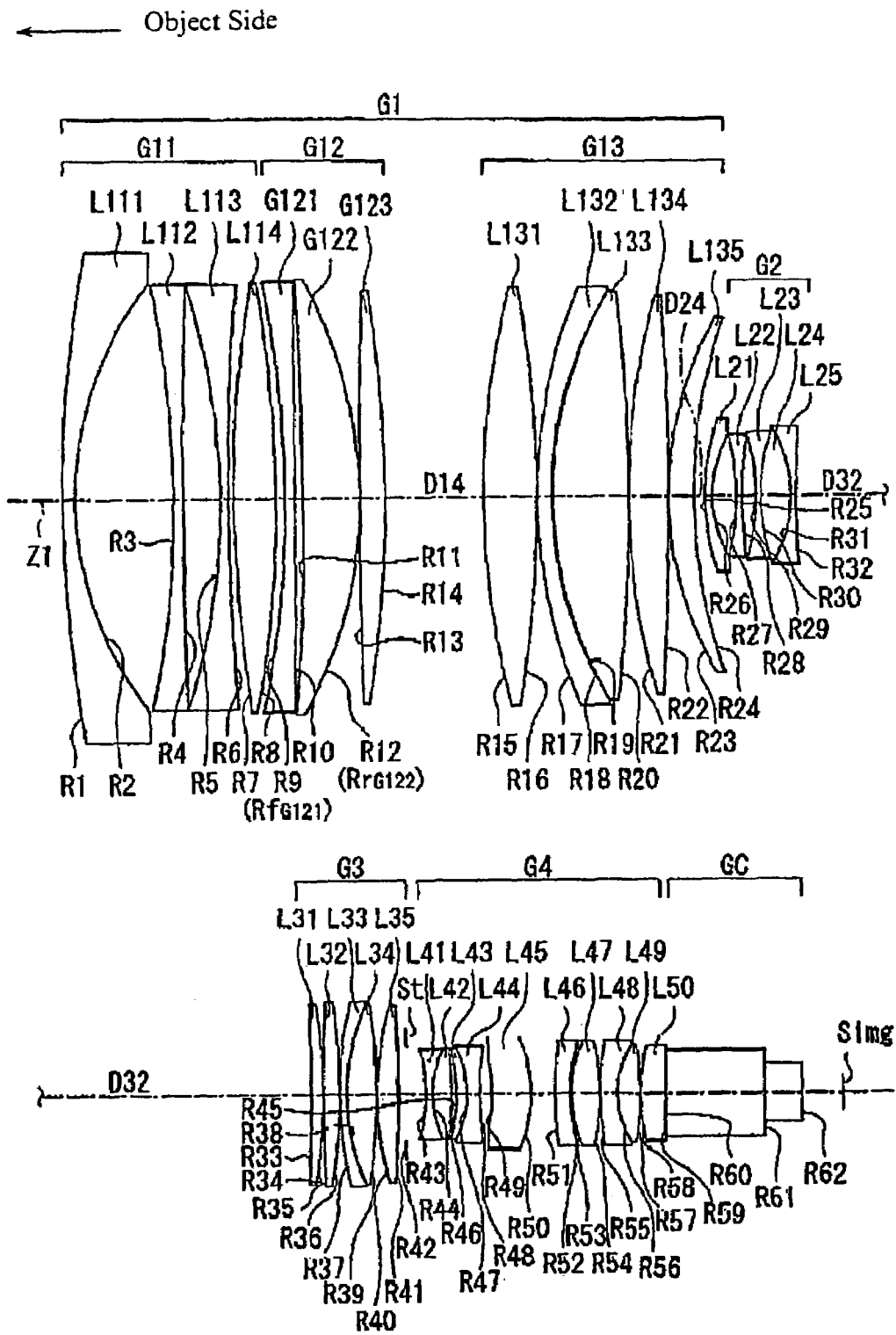
FIG. 2 shows a detailed cross-sectional view of Embodiment 1 of the zoom lens of the present invention at the wide-angle end.

A general description of the preferred embodiments of the zoom lens of the present invention will now be described with reference to FIGS. 1 and 2 that show Embodiment 1. FIG. 1 shows cross-sectional views of Embodiment 1 of the present invention at the wide-angle end (WIDE) with the focus at infinity and at the telephoto end (TELE) with the focus at infinity. Straight line arrows in FIG. 1 indicate the movement of lens groups G2 and G3 along the optical axis of the zoom lens when zooming between the two illustrated zoom settings. Lens groups G1 and G4 remain stationary during zooming. FIG. 1 also indicates movement of lens subgroup G12 along the optical axis for focusing at a closer distance than infinity by a short horizontal arrow line under lens group G12. FIG. 2 shows a detailed cross-sectional view of Embodiment 1 of the zoom lens of the present invention at the wide-angle end with the focus at infinity. In FIG. 1 and FIG. 2, lens groups are referenced by the letter G followed by a one digit number denoting their order from the object side of the zoom lens, from G1 to G4, and with lens group G1 being further divided, in order from the object side, into a first lens subgroup G11, a second lens subgroup G12, and a third lens subgroup G13. Similarly, in FIG. 1 and FIG. 2, some lens elements are referenced by the letter L followed by a number, a two-digit number in the case of lens elements that belong to a lens group that has not been divided into lens subgroups and a three-digit number in the case of lens elements that belong to a lens subgroup. In either case, the first digit of the number denotes the lens group to which the lens element belongs and the last digit denotes the relative order of lens elements of the lens group or lens subgroup from the object side of the zoom lens. However, lens elements of lens subgroup G12 are referenced not by the letter L but rather by the letter G followed by a three-digit number. The first two digits following the letter G refer to lens subgroup G12 and the third digit denotes the relative order of the lens elements of lens subgroup G12 from the object side of the zoom lens. Also, in FIG. 2, the radii of curvature of the optical surfaces of all the optical elements are referenced by the letter R followed by a number denoting their order from the object side of the zoom lens, from R1 to R62. The surface numbers of the lens elements are not shown in FIG. 2. However, the surface numbers are the same as the number denoting the radius of curvature of a given surface. The on-axis surface spacings along the optical axis Z1 of all the optical element surfaces are referenced by the letter D followed by a number denoting their order from the object side of the zoom lens, although not all the on-axis surface spacings are explicitly referenced in FIGS. 1 and 2 in order to maintain clarity of the illustration. However, the on-axis surface spacing D14 that varies with focusing and the on-axis surface spacings D24, D32 and D41 that vary with zooming are explicitly referenced. In FIGS. 1 and 2, brackets are used to indicate the lens elements that belong to various lens groups and lens subgroups, and a further bracket is referenced by GC in FIG. 1 and FIG. 2 that is associated with a color separation system formed of, for example, a color separation prism. An image formation surface (imaging surface) Simg is also shown at the right side of FIG. 1 and FIG. 2.

The definitions of the terms "lens element," "lens component", "lens group," and "lens subgroup" that relate to the descriptions above and the following detailed description are as follows. The term "lens element" is herein defined as a single transparent mass of refractive material having two opposed refracting surfaces that are positioned at least generally transversely to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." In the following descriptions, references will be frequently made to a "lens element." However, as set forth above, it is understood that numerous of the lens elements described below are also lens components and may be replaced by lens components that include more than one lens element.

The term "lens group" is herein defined as an assembly of one or more lens components in optical series along an optical axis and without any intervening lens component that do not move relatively to one another during zooming of a zoom lens. The term "lens subgroup" is herein defined as an assembly of one or more lens components in optical series and without any intervening lens component that belong to a single lens group and that do not move relatively to one another during focusing of the zoom lens but do move relatively to another lens subgroup of the same single lens group during focusing of the zoom lens.

The zoom lens of the present invention may be used, for example, as the imaging optics of a high efficiency camera for television broadcasting or of a video camera that focuses light from an object as a real image onto a solid state imaging element situated at the imaging plane Simg or the zoom lens where the real image is formed. As shown in FIG. 1 and FIG. 2, the zoom lens includes four lens groups, arranged in order from the object side of the zoom lens along an optical exist as follows: a first lens group G1 having positive refractive power; a second lens group G2 having negative refractive power; a third lens group G3; and a fourth lens group G4 having positive refractive power. The first lens group G1 and the fourth lens group G4 do not move during zooming, and the second lens group G2 and the third lens group G3 are moved along the optical axis during zooming. The third lens group G3 may have negative refractive power. As shown in FIG. 1 and FIG. 2, a diaphragm stop St may be arranged between the third lens group G3 and the fourth lens group G4.

As mentioned above, an imaging element (not shown in the drawings), such as a solid state imaging element, may be positioned at the imaging plane Simg. Various optical elements may be arranged between the fourth lens group G4 and the imaging surface Simg in accordance with desired imaging features, for example, as mentioned previously, the color separation optical system GC shown in FIG. 1 and FIG. 2.

The first lens group G1 functions as the focusing group. This first lens group G1 includes, arranged in order from the object side of the zoom lens along the optical axis, a first lens subgroup G11 having negative refractive power that does not move during focusing of the zoom lens, a second lens subgroup G12 having positive refractive power that moves during focusing of the zoom lens, and a third lens subgroup G13 having positive refractive power that does not move during focusing of the zoom lens.

The first lens subgroup G11 includes, arranged in order from the object side of the zoom lens along the optical axis, a first lens element L111 having negative refractive power, a second lens element L112 having negative refractive power, a third lens element L113 having negative refractive power, and a fourth lens element L114 having positive refractive power. However, the first lens subgroup G11 may include only three lens elements by omitting one of the lens elements having negative refractive power.

Figure 3:
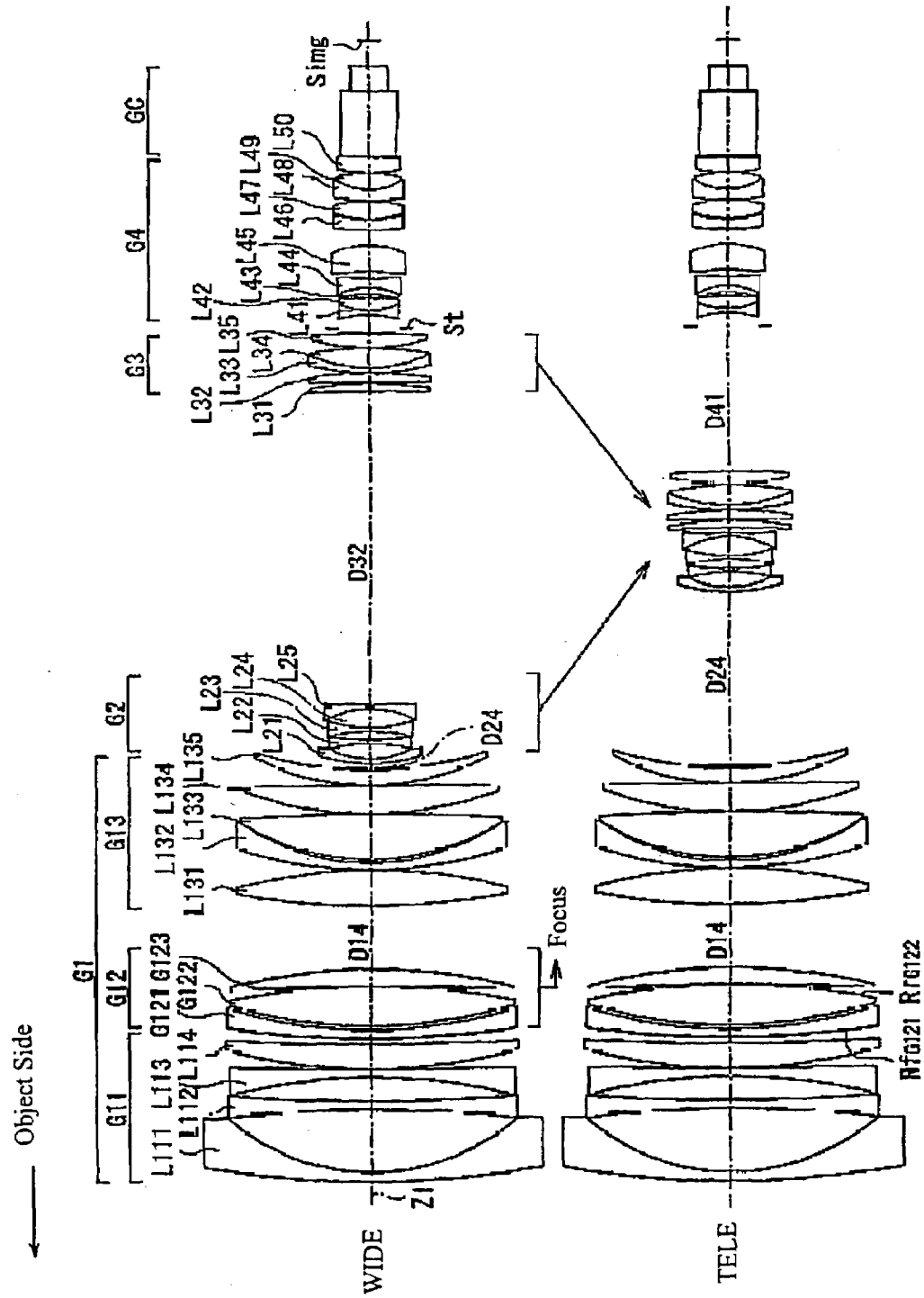
FIG. 3 shows cross-sectional views of Embodiment 7 of the present invention at the wide-open angle end (WIDE) and at the telephoto end (TELE)

The second lens subgroup G12 of the first lens group G1, which is the first lens subgroup of the first lens group G1 having positive refractive power, is particularly characteristic of the zoom lens of the present invention. This lens subgroup G12 includes, arranged in order from the object side of the zoom lens along the optical axis, a first lens element G121 having negative refractive power, a second lens element G122 having positive refractive power, and a third lens element G123 having positive refractive power. The first lens element G121 and the second lens element G122 may be cemented together to form a lens component. As shown in FIG. 1 and FIG. 2, the first lens element G121 may be, for example, a meniscus lens element having its convex surface on the image side. However, as shown in FIG. 3 that illustrates Embodiment 7, the first lens element may also be a meniscus lens element having its convex surface on the object side. In both FIG. 1 and FIG. 3, the image-side surface of the second lens element G122 is convex. In FIG. 1, the second lens element G122 is a meniscus lens element. However, in FIG. 3, the second lens element G122 is a biconvex lens element. The third lens element G123 may be a biconvex lens, as shown for example in FIG. 1 and FIG. 2. However, the third lens element may also be a meniscus lens element with its convex surface on the image side, as shown for example in FIG. 3.

The third lens subgroup G13 of the first lens group G1, which is the second lens subgroup of the first lens group G1 having positive refractive power, includes, arrange in order from the object side of the zoom lens along the optical axis, a first lens element L131 having positive refractive power, a second lens element L132 having negative refractive power, and a plurality of lens elements L133 through L135, each having positive refractive power. The first lens element L131 is, for example, a biconvex lens element. The second lens element L132 is, for example, a meniscus lens element with its convex surface on the object side.

The second lens group G2 and the third lens group G3 provide the zoom function of the zoom lens. The second lens group G2 includes, for example, five lens elements L121 through L25. The third lens group G3 includes, for example, five lens elements L31 through L35, as shown in FIG. 1 and FIG. 2.

The fourth lens group G4 provide a relay function for the zoom lens. The fourth lens group G4 includes, for example, ten lens elements L41 through L50, as shown in FIG. 1 and FIG. 2.

Preferably, the zoom lens of the present invention satisfies the following conditions:

$$0.4 < (Rf_{G121} - Rr_{G122})/(Rf_{G121} + Rr_{G122}) < 4.5 \qquad \text{Condition (1)}$$

$$1.0 < F_{G121, G122}/F_{G12} < 4.4 \qquad \text{Condition (2)}$$

$$4.0 < F_{G12}/F_{G1} < 7.0 \qquad \text{Condition (3)}$$

where $Rf_{G121}$ is the radius of curvature of the lens surface on the object side of the first lens element of the second lens subgroup of the first lens group, $Rr_{G122}$ is the radius of curvature of the lens surface on the image side of the second lens element of the second lens subgroup of the first lens group, $F_{G12}$ is the focal length of the second lens subgroup of the first lens group, $F_{G121, G122}$ is the composite focal length of the first lens element and the second lens element of the second lens subgroup, and $F_{G1}$ is the focal length of the first lens group.

In Embodiment 1, as indicated generally in FIG. 1 and more specifically in FIG. 2, $Rf_{G121}$ is R9 and $Rr_{G122}$ is R12. This is also true in Embodiments 2–7, which are very similar to Embodiment 1, with FIG. 3 indicating that fact with regard to Embodiment 7 by reference symbols $Rf_{G121}$ and $Rr_{G122}$ being shown.

Additionally, even more preferably, as a further restriction on Condition (1), it is preferable that the zoom lens satisfy the following condition:

$$0.4 < (Rf_{G121} - Rr_{G122})/(Rf_{G121} + Rr_{G122}) < 2.0 \qquad \text{Condition (1-1)}$$

When the lower limit of Condition (1) is not satisfied, coma aberration increases so much that correction becomes very difficult. When the upper limit of Condition (1) is not satisfied, fluctuations in the angle of view (field angle) during focusing become large. Satisfying the upper limit of Condition (1-1) further reduces fluctuations in the angle of view during focusing.

When Condition (2) is not satisfied, field curvature increases so much that it is difficult to correct. When the lower limit of Condition (3) is not satisfied, coma aberration increases so much that it is difficult to correct. When the upper limit of Condition (3) is not satisfied, the field curvature increases so much that it is difficult to correct.

The zoom lens of the present invention relates to a large extent to the construction of the first lens group G1, especially to the construction of the second lens subgroup G12, that is the lens subgroup of the first lens group G1 that has positive refractive power and that is used for focusing the zoom lens. Therefore, lens groups other than the first lens group G1 are subject to wide variations in design, including the number of lens elements and lens components used in these groups and in the shapes of the lens surfaces.

The zoom lens of the present invention performs zooming by movement of the second lens group G2 and the third lens group G3 along the optical axis Z1 as shown in FIG. 1. More specifically, the zooming or variating function is performed by moving the second lens group G2 along the optical axis Z1 and the compensating function of correcting for the movement of the image plane along the optical axis Z1 is performed by moving the third lens group G3 along the optical axis Z1. As shown in FIG. 1, straight line arrows indicate the directions of movement along the optical axis Z1 of the second lens group G2 and the third lens group G3 during zooming from the wide-angle end to the telephoto end of the zoom range. Furthermore, this zoom lens performs focusing by moving one portion of the first lens group G1, that is, the lens subgroup G12 that has positive refractive power along the optical axis Z1. More specifically, as indicated in FIG. 1 by a short horizontal arrow, when focusing from infinity to the close range side, the first positive lens group G12 used for focusing moves toward the image side along the optical axis Z1.

In the zoom lens of the present invention, the most object side lens subgroup having positive refractive power of the first lens group G1, that is, lens subgroup G12, which is used for focusing the zoom lens, includes lens element G121 having negative refractive power and lens elements G122 and G123 having positive refractive power. By positioning the lens element having negative refractive power on the object side of the lens subgroup G12, the zoom lens may be made more compact, and reducing the fluctuations in the angle of view (field angle) and fluctuations in various aberrations must also be considered. More specifically, with the lens subgroup G12 having positive refractive power being used for focusing, by arranging the lens element of this subgroup that is nearest the object side to be a lens element having negative refractive power (lens element G121) followed by a lens element having positive refractive power (lens element G122), for example, a desirable achromatic effect can be achieved when the shapes of the object-side surface of the lens element having negative refractive power (lens element G121) and the image-side surface of the lens element having positive refractive power (lens element G122) are optimized. Because peripheral luminous fluxes at the wide-angle end pass through the outer portion, relatively far from the optical axis, of the lens subgroup G12 which is used for focusing, it is preferable for optical performance that the lens elements G121 and G122 in the lens subgroup G12 provide a desirable achromatic effect by being arranged negative and positive, in that order from the object side. Additionally, such placement of these lens elements is also preferable in order to reduce fluctuations in the angle of view (field angle) and fluctuations in various aberrations during focusing. In contrast, the zoom lenses described in Japanese Laid-Open Patent Application 2001-116993 and Japanese Patent 3376177 are inferior in this regard because lens components having positive refractive power are arranged on the object side of the lens subgroup that is used for focusing (and that corresponds to lens subgroup G12 of the zoom lens of the present invention).

Additionally, in the zoom lens of the present invention, because peripheral luminous fluxes it the wide-angle end deviate from the optical axis as they enter the zoom lens, the transmission positions of the luminous fluxes are critical in determining the diameters of the object-side lens elements, particularly the lens elements of lens subgroup G11. Accordingly, with this zoom lens, by arranging the lens element L131 having positive refractive power on the object side of lens subgroup G13 and by smoothing the beam angles of the maximum peripheral luminous fluxes that form images at the corners of the effective aperture between the first lens subgroup G12 having positive refractive power and the second lens subgroup G13 having positive refractive power, the diameters of the lens elements of the lens subgroup G11 having negative refractive power that is on the object side of the zoom lens can be minimized.

As described above, a higher efficiency zoom lens that reduces fluctuations in the angle of view (field angle) and fluctuations in various aberrations during focusing can be achieved while keeping the zoom lens small by using a four-group construction, by inner focusing being provided by moving a lens subgroup (G12) of the object-side lens group (G1), by making the arrangement, shapes, power distributions, and similar variables of the lens elements of the object-side lens group (G1) appropriate, by making this lens subgroup (G12) that provides focusing of positive refractive power overall and making this lens subgroup (G12) to include a negative lens element (G121) on its object side and two positive lens elements (G122 and G123), and by satisfying Conditions (1)–(3) above. In particular, with the above construction, it is easier to realize a small, highly efficient zoom lens for a television camera that uses a solid state image sensor having a size of two-thirds of an inch and that provides: an image size of 11 mm, a zoom ratio of about 26, an f-number of about 1.57, an angle of view (field angle) of about 82° at the wide-angle end, and a shortest imaging distance of about 0.6 meters.

Embodiments 1–7 of the present invention will now be individually described with further reference to the drawings.

EMBODIMENT 1

FIG. 1 shows cross-sectional views of Embodiment 1 of the present invention at the wide-angle end (WIDE) and at the telephoto end (TELE). Table 1 below lists, in order from the object side, the lens group, the lens subgroup (when appropriate), the surface number #, the radius of curvature R (in mm) of each surface, the on-axis surface spacing D (in mm), as well as the refractive index $N_d$ and the Abbe number $v_d$ (both at the d-line of 587.6 nm) of each optical element of Embodiment 1, including the color separation optical system GC.

TABLE 1

| Group | Subgroup | # | R | D | $N_d$ | $v_d$ |
|---|---|---|---|---|---|---|
| G1 | G11 | 1 | 460.143 | 4.3003 | 1.78954 | 49.0 |
| | | 2 | 118.139 | 33.2986 | | |
| | | 3 | −360.254 | 4.0999 | 1.76174 | 51.8 |
| | | 4 | 3535.890 | 11.7409 | | |
| | | 5 | −245.273 | 3.8000 | 1.77636 | 50.4 |
| | | 6 | 901.852 | 0.9999 | | |
| | | 7 | 478.127 | 14.3551 | 1.80518 | 25.4 |
| | | 8 | −428.076 | 2.6680 | | |
| | G12 | 9 | −404.100 | 3.5999 | 1.80518 | 25.4 |
| | | 10 | 4664.237 | 1.5796 | | |
| | | 11 | −2993.498 | 20.6154 | 1.43875 | 95.0 |
| | | 12 | −153.278 | 0.1199 | | |
| | | 13 | 6475.132 | 9.4452 | 1.43875 | 95.0 |
| | | 14 | −363.820 | 33.4057 | | |
| | G13 | 15 | 278.227 | 18.2691 | 1.43387 | 95.1 |
| | | 16 | −397.128 | 0.1205 | | |
| | | 17 | 201.274 | 3.8030 | 1.74574 | 27.8 |
| | | 18 | 131.871 | 0.9154 | | |
| | | 19 | 135.703 | 25.5423 | 1.43387 | 95.1 |
| | | 20 | −656.909 | 0.1213 | | |
| | | 21 | 242.168 | 14.1250 | 1.49700 | 81.6 |
| | | 22 | −1024.907 | 0.1200 | | |
| | | 23 | 122.855 | 8.6580 | 1.49700 | 81.6 |
| | | 24 | 191.203 | D24 (variable) | | |
| G2 | | 25 | 91.138 | 2.0213 | 1.74100 | 52.7 |
| | | 26 | 42.220 | 8.7087 | | |
| | | 27 | −76.600 | 2.0003 | 1.71300 | 53.9 |

TABLE 1-continued

| Group | Subgroup | # | R | D | $N_d$ | $v_d$ |
|---|---|---|---|---|---|---|
| | | 28 | 198.277 | 4.2788 | | |
| | | 29 | −73.536 | 2.0000 | 1.71300 | 53.9 |
| | | 30 | 81.946 | 9.7543 | 1.80518 | 25.4 |
| | | 31 | −50.636 | 2.0000 | 1.80400 | 46.6 |
| | | 32 | 658.459 | D32 (variable) | | |
| G3 | | 33 | 1825.454 | 4.9090 | 1.43875 | 95.0 |
| | | 34 | −146.008 | 0.1200 | | |
| | | 35 | 432.880 | 5.5389 | 1.43875 | 95.0 |
| | | 36 | −164.557 | 0.1199 | | |
| | | 37 | 172.075 | 1.9999 | 1.84666 | 23.8 |
| | | 38 | 78.794 | 10.6343 | 1.49700 | 81.6 |
| | | 39 | −173.082 | 0.1199 | | |
| | | 40 | 105.999 | 6.9128 | 1.49700 | 81.6 |
| | | 41 | −397.029 | D41 (variable) | | |
| | | 42 | ∞ (stop) | 7.0449 | | |
| G4 | | 43 | −61.433 | 2.0000 | 1.72916 | 54.7 |
| | | 44 | 33.519 | 6.7200 | 1.80518 | 25.4 |
| | | 45 | −117.500 | 1.8482 | | |
| | | 46 | −44.882 | 3.8657 | 1.80518 | 25.4 |
| | | 47 | −32.219 | 4.7142 | 1.80400 | 46.6 |
| | | 48 | 227.401 | 3.4603 | | |
| | | 49 | −109.753 | 13.8084 | 1.71700 | 47.9 |
| | | 50 | −46.463 | 8.1988 | | |
| | | 51 | 254.527 | 5.3778 | 1.88300 | 40.8 |
| | | 52 | 80.216 | 0.1820 | | |
| | | 53 | 54.682 | 9.1504 | 1.48749 | 70.2 |
| | | 54 | −75.554 | 0.4045 | | |
| | | 55 | 116.193 | 5.4210 | 1.80809 | 22.8 |
| | | 56 | 31.498 | 8.3324 | 1.49700 | 81.6 |
| | | 57 | −88.018 | 0.1202 | | |
| | | 58 | 65.849 | 8.7226 | 1.48749 | 70.2 |
| | | 59 | 3898.787 | 0.0000 | | |
| GC | | 60 | ∞ | 33.0000 | 1.60859 | 46.5 |
| | | 61 | ∞ | 13.2000 | 1.51633 | 64.1 |
| | | 62 | ∞ | 21.9916 | | |

In the zoom lens of Embodiment 1, both the second lens group G2 and the third lens group G3 move during zooming. Therefore, the on-axis spacings D24, D32, and D41 change with zooming. With zooming, the focal length f and the f-number $F_{NO}$ also change. Table 2 below lists the values of the focal length f (in mm), the f-number $F_{NO}$, and the variable D24, D32, and D41 (in mm) at the wide-angle end (f=6.77627 mm) and at the telephoto end (f=175.6885 mm) when the zoom lens is focused at infinity.

TABLE 2

| f | $F_{NO}$ | D24 | D32 | D41 |
|---|---|---|---|---|
| 6.77627 | 1.57000 | 3.92565 | 164.64375 | 2.64629 |
| 175.6885 | 2.307 | 94.41169 | 1.8622 | 74.9418 |

As can be understood from the data of Table 2, the zoom ratio of the zoom lens of Embodiment 1 is relatively high, about 26, and the f-number $F_{NO}$ is 1.57 at the wide-angle end, which is indicative of a relatively bright lens system.

The zoom lens of Embodiment 1 of the present invention satisfies Conditions (1)–(3) above as set forth in Table 3 below.

TABLE 3

| Condition No. | Condition | Value |
|---|---|---|
| (1) | $0.4 < (Rf_{G121} − Rr_{G122})/(Rf_{G121} + Rr_{G122}) < 4.5$ | 0.45000 |
| (2) | $1.0 < F_{G121, G122}/F_{G12} < 4.4$ | 2.98406 |
| (3) | $4.0 < F_{G12}/F_{G1} < 7.0$ | 5.64608 |

Additionally, the zoom lens of Embodiment 1 reduces the fluctuations in the angle of view (field angle) during focusing. More specifically, for an image height of 4.4 mm at the wide-angle end, the half-field angle with the zoom lens focused at infinity is 41.08° and with the zoom lens focused at a close focus of 600 mm is 41.33°. As can be understood from this data, the zoom lens of Embodiment 1 has relatively small variations in the angle of view (field angle) at the wide-angle end during focusing.

FIGS. 4A–4C show the spherical aberration, astigmatism, and distortion, respectively, of the zoom lens of Embodiment 1 at the wide-angle end. FIGS. 5A–5C show the spherical aberration, astigmatism, and distortion, respectively, of the zoom lens of Embodiment 1 at the telephoto end. The ordinate in FIGS. 4A and 5A is $F_{NO}$, whereas in FIGS. 4B, 4C, 5B and 5C, the ordinate is image height, in mm. In the figures, the aberrations are shown for a wavelength of 546.1 nm (the e-line). In FIGS. 4B and 5B, the astigmatism is shown for the sagittal image surface S and the tangential image surface T. As is apparent from these figures, the various aberrations of Embodiment 1 are favorably corrected over the entire range of zoom.

EMBODIMENT 2

Embodiment 2 is very similar to Embodiment 1 and therefore is well represented by FIG. 1. However, Embodiment 2 is even more similar to Embodiment 7, which is shown in FIG. 3, and which will be described last among Embodiments 1–7. Table 4 below lists, in order from the object side, the lens group, the lens subgroup (when appropriate), the surface number #, the radius of curvature R (in mm) of each surface, the on-axis surface spacing D (in mm), as well as the refractive index $N_d$ and the Abbe number $v_d$ (both at the d-line of 587.6 nm) of each optical element of Embodiment 2, including the color separation optical system GC.

TABLE 4

| Group | Subgroup | # | R | D | $N_d$ | $v_d$ |
|---|---|---|---|---|---|---|
| G1 | G11 | 1 | 480.868 | 4.300 | 1.77082 | 50.9 |
| | | 2 | 111.773 | 33.567 | | |
| | | 3 | −622.678 | 4.100 | 1.74521 | 53.5 |
| | | 4 | 1207.525 | 11.815 | | |
| | | 5 | −293.527 | 3.800 | 1.73101 | 54.9 |
| | | 6 | 629.655 | 1.000 | | |
| | | 7 | 308.211 | 14.072 | 1.80518 | 25.4 |
| | | 8 | −1473.091 | 2.239 | | |
| | G12 | 9 | 2679.844 | 3.600 | 1.80518 | 25.4 |
| | | 10 | 360.160 | 1.746 | | |
| | | 11 | 397.863 | 20.841 | 1.43875 | 95.0 |
| | | 12 | −243.620 | 0.120 | | |
| | | 13 | −7202.860 | 9.004 | 1.43875 | 95.0 |
| | | 14 | −378.445 | 33.758 | | |
| | G13 | 15 | 276.561 | 18.980 | 1.43387 | 95.1 |
| | | 16 | −331.983 | 0.120 | | |
| | | 17 | 240.342 | 3.800 | 1.69228 | 30.6 |
| | | 18 | 132.014 | 1.075 | | |
| | | 19 | 138.379 | 25.457 | 1.43387 | 95.1 |
| | | 20 | −463.771 | 0.120 | | |
| | | 21 | 209.879 | 14.045 | 1.49700 | 81.6 |
| | | 22 | −1767.147 | 0.120 | | |
| | | 23 | 121.524 | 8.638 | 1.49700 | 81.0 |
| | | 24 | 193.276 | D24 (variable) | | |
| G2 | | 25 | 102.125 | 2.000 | 1.74100 | 52.7 |
| | | 26 | 42.476 | 8.328 | | |
| | | 27 | −80.127 | 2.000 | 1.71300 | 53.9 |
| | | 28 | 266.901 | 3.984 | | |
| | | 29 | −74.311 | 2.000 | 1.71300 | 53.9 |
| | | 30 | 80.541 | 9.563 | 1.80518 | 25.4 |

TABLE 4-continued

| Group | Subgroup | # | R | D | $N_d$ | $v_d$ |
|---|---|---|---|---|---|---|
| | | 31 | −50.411 | 2.008 | 1.80400 | 46.6 |
| | | 32 | 497.377 | D32 (variable) | | |
| G3 | | 33 | 2019.526 | 4.644 | 1.43875 | 95.0 |
| | | 34 | −150.900 | 0.120 | | |
| | | 35 | 406.075 | 5.282 | 1.43875 | 95.0 |
| | | 36 | −174.251 | 0.120 | | |
| | | 37 | 188.602 | 2.000 | 1.84666 | 23.8 |
| | | 38 | 82.203 | 10.095 | 1.49700 | 81.6 |
| | | 39 | −176.514 | 0.120 | | |
| | | 40 | 104.085 | 6.693 | 1.49700 | 81.6 |
| | | 41 | −452.338 | D41 (variable) | | |
| | | 42 | ∞ (stop) | 6.995 | | |
| G4 | | 43 | −61.613 | 2.016 | 1.72916 | 54.7 |
| | | 44 | 34.418 | 6.752 | 1.80518 | 25.4 |
| | | 45 | −116.903 | 1.813 | | |
| | | 46 | −44.274 | 3.906 | 1.80518 | 25.4 |
| | | 47 | −32.659 | 4.727 | 1.80400 | 46.6 |
| | | 48 | 263.615 | 3.419 | | |
| | | 49 | −117.880 | 13.850 | 1.71700 | 47.9 |
| | | 50 | −46.668 | 8.172 | | |
| | | 51 | 255.733 | 5.379 | 1.88300 | 40.8 |
| | | 52 | 81.821 | 0.125 | | |
| | | 53 | 55.375 | 9.133 | 1.48749 | 70.2 |
| | | 54 | −78.633 | 0.348 | | |
| | | 55 | 111.309 | 5.446 | 1.80809 | 22.8 |
| | | 56 | 31.863 | 8.375 | 1.49700 | 81.6 |
| | | 57 | −94.510 | 0.121 | | |
| | | 58 | 63.240 | 8.782 | 1.48749 | 70.2 |
| | | 59 | 2222.539 | 0.0000 | | |
| GC | | 60 | ∞ | 33.0000 | 1.60859 | 46.5 |
| | | 61 | ∞ | 13.2000 | 1.51633 | 64.1 |
| | | 62 | ∞ | 21.893 | | |

In the zoom lens of Embodiment 2, both the second lens group G2 and the third lens group G3 move during zooming. Therefore, the on-axis spacings D24, D32, and D41 change with zooming. With zooming, the focal length f and the f-number $F_{NO}$ also change. Table 5 below lists the values of the focal length f (in mm), the f-number $F_{NO}$, and the variables D24, D32, and D41 (in mm) at the wide-angle end (f=6.77225 mm) and at the telephoto end (f=175.5966 mm) when the zoom lens is focused at infinity.

TABLE 5

| f | $F_{NO}$ | D24 | D32 | D41 |
|---|---|---|---|---|
| 6.77225 | 1.57000 | 3.88240 | 166.21613 | 2.64167 |
| 175.5966 | 2.3 | 91.9197 | 1.87046 | 78.95004 |

As can be understood from the data of Table 5, the zoom ratio of the zoom lens of Embodiment 2 is relatively high, about 26, and the f-number $F_{NO}$ is 1.57 at the wide-angle end, which is indicative of a relatively bright lens system.

The zoom lens of Embodiment 2 of the present invention satisfies Conditions (1)–(3) above as set forth in Table 6 below.

TABLE 6

| Condition No. | Condition | Value |
|---|---|---|
| (1) | $0.4 < (Rf_{G121} − Rr_{G122})/(Rf_{G121} + Rr_{G122}) < 4.5$ | 1.20000 |
| (2) | $1.0 < F_{G121, G122}/F_{G12} < 4.4$ | 2.10820 |
| (3) | $4.0 < F_{G12}/F_{G1} < 7.0$ | 5.31745 |

Additionally, the zoom lens of Embodiment 2 reduces the fluctuations in the angle of view (field angle) during focusing. More specifically, for an image height of 4.4 mm at the wide-angle end, the half-field angle with the zoom lens focused at infinity is 41.11° and with the zoom lens focused at a close focus of 600 mm is 40.82°. As can be understood from this data, the zoom lens of Embodiment 2 has relatively small variations in the angle of view (field angle) at the wide-angle end during focusing.

Figure 6A:
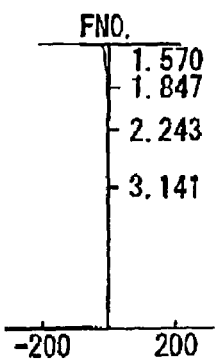
FIGS. 6A–6C show the spherical aberration, astigmatism, and distortion, respectively, of the zoom lens according to Embodiment 2 at the wide-angle end.
Figure 6B:
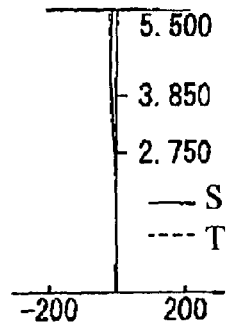
Figure 6C:
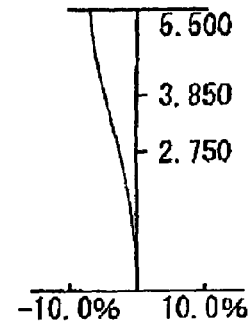
Figure 7A:
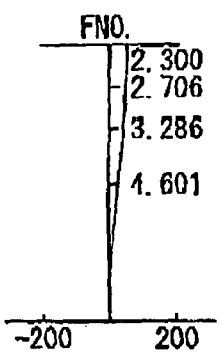
FIGS. 7A–7C show the spherical aberration, astigmatism, and distortion, respectively, of the zoom lens according to Embodiment 2 at the telephoto end.
Figure 7B:
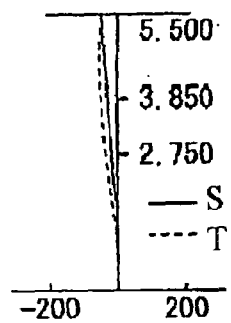
Figure 7C:
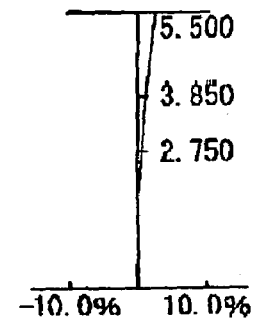

FIGS. 6A–6C show the spherical aberration, astigmatism, and distortion, respectively, of the zoom lens of Embodiment 2 at the wide-angle end. FIGS. 7A–7C show the spherical aberration, astigmatism, and distortion, respectively, of the zoom lens of Embodiment 2 at the telephoto end. The ordinate in FIGS. 6A and 7A is $F_{NO}$, whereas in FIGS. 6B, 6C, 7B and 7C, the ordinate is image height, in mm. In the Figures, the aberrations are shown for a wavelength of 546.1 nm (the e-line). In FIGS. 6B and 7B, the astigmatism is shown for the sagittal image surface S and the tangential image surface T. As is apparent from these figures, the various aberrations of Embodiment 2 are favorably corrected over the entire range of zoom.

EMBODIMENT 3

Embodiment 3 is very similar to Embodiment 1 and therefore is well represented by FIG. 1. Table 7 below lists, in order from the object side, the lens group, the lens subgroup (when appropriate), the surface number #, the radius of curvature R (in mm) of each surface, the on-axis surface spacing D (in mm), as well as the refractive index $N_d$ and the Abbe number $v_d$ (both at the d-line of 587.6 nm) of each optical element of Embodiment 3, including the color separation optical system GC.

TABLE 7

| Group | Subgroup | # | R | D | $N_d$ | $v_d$ |
|---|---|---|---|---|---|---|
| G1 | G11 | 1 | 663.430 | 4.300 | 1.78909 | 49.1 |
| | | 2 | 113.178 | 33.175 | | |
| | | 3 | −884.049 | 4.100 | 1.77479 | 50.4 |
| | | 4 | 2879.081 | 11.487 | | |
| | | 5 | −317.244 | 3.800 | 1.76225 | 51.8 |
| | | 6 | 477.916 | 1.000 | | |
| | | 7 | 276.954 | 13.745 | 1.80518 | 25.4 |
| | | 8 | −1760.549 | 2.280 | | |
| | G12 | 9 | −1684.105 | 3.600 | 1.80518 | 25.4 |
| | | 10 | 474.786 | 1.998 | | |
| | | 11 | 538.002 | 20.152 | 1.43875 | 95.0 |
| | | 12 | −237.228 | 0.120 | | |
| | | 13 | −3293.409 | 11.365 | 1.43875 | 95.0 |
| | | 14 | −262.052 | 33.449 | | |
| | G13 | 15 | 407.078 | 18.141 | 1.43387 | 95.1 |
| | | 16 | −264.073 | 0.120 | | |
| | | 17 | 156.151 | 3.800 | 1.74604 | 30.7 |
| | | 18 | 107.932 | 1.488 | | |
| | | 19 | 109.810 | 25.657 | 1.43387 | 95.1 |
| | | 20 | 5838.653 | 0.120 | | |
| | | 21 | 291.412 | 14.032 | 1.49700 | 81.6 |
| | | 22 | −641.919 | 0.120 | | |
| | | 23 | 126.792 | 8.824 | 1.49700 | 81.6 |
| | | 24 | 208.744 | D24 (variable) | | |
| G2 | | 25 | 118.288 | 2.000 | 1.74100 | 52.7 |
| | | 26 | 42.509 | 8.481 | | |
| | | 27 | −74.447 | 2.002 | 1.71300 | 53.9 |
| | | 28 | 191.291 | 4.027 | | |
| | | 29 | −82.036 | 2.012 | 1.71300 | 53.9 |
| | | 30 | 87.772 | 9.813 | 1.80518 | 25.4 |
| | | 31 | −48.517 | 2.000 | 1.80400 | 46.6 |
| | | 32 | 1159.925 | D32 (variable) | | |
| G3 | | 33 | 3332.056 | 4.784 | 1.43875 | 95.0 |
| | | 34 | −143.500 | 0.120 | | |
| | | 35 | 425.602 | 5.436 | 1.43875 | 95.0 |
| | | 36 | −167.519 | 0.120 | | |
| | | 37 | 183.537 | 2.000 | 1.84666 | 23.8 |
| | | 38 | 80.624 | 10.681 | 1.49700 | 81.6 |

TABLE 7-continued

| Group | Subgroup | # | R | D | $N_d$ | $v_d$ |
|---|---|---|---|---|---|---|
| | | 39 | −162.651 | 0.120 | | |
| | | 40 | 96.547 | 7.236 | 1.49700 | 81.6 |
| | | 41 | −445.458 | D41 (variable) | | |
| | | 42 | ∞ (stop) | 7.371 | | |
| G4 | | 43 | −60.087 | 2.007 | 1.72916 | 54.7 |
| | | 44 | 32.775 | 6.548 | 1.80518 | 25.4 |
| | | 45 | −119.966 | 1.890 | | |
| | | 46 | −45.158 | 3.820 | 1.80518 | 25.4 |
| | | 47 | −31.786 | 4.712 | 1.80400 | 46.6 |
| | | 48 | 211.565 | 3.359 | | |
| | | 49 | −105.457 | 13.875 | 1.71700 | 47.9 |
| | | 50 | −46.071 | 8.069 | | |
| | | 51 | 243.134 | 5.327 | 1.88300 | 40.8 |
| | | 52 | 83.411 | 0.123 | | |
| | | 53 | 56.356 | 9.032 | 1.48749 | 70.2 |
| | | 54 | −72.463 | 0.225 | | |
| | | 55 | 122.218 | 5.347 | 1.80809 | 22.8 |
| | | 56 | 31.416 | 8.949 | 1.49700 | 81.6 |
| | | 57 | −88.223 | 0.120 | | |
| | | 58 | 66.877 | 8.505 | 1.48749 | 70.2 |
| | | 59 | −68034.236 | 0.0000 | | |
| GC | | 60 | ∞ | 33.0000 | 1.60859 | 46.5 |
| | | 61 | ∞ | 13.2000 | 1.51633 | 64.1 |
| | | 62 | ∞ | 22.063 | | |

In the zoom lens of Embodiment 3, both the second lens group G2 and the third lens group G3 move during zooming. Therefore, the on-axis spacings D24, D32, and D41 change with zooming. With zooming, the focal length f and the f-number $F_{NO}$ also change. Table 8 below lists the values of the focal length f (in mm), the f-number $F_{NO}$, and the variables D24, D32, and D41 (in mm) at the wide-angle end (f=6.77706 mm) and at the telephoto end (f=175.7233 mm) when the zoom lens is focused at infinity.

TABLE 8

| f | $F_{NO}$ | D24 | D32 | D41 |
|---|---|---|---|---|
| 6.77706 | 1.57000 | 3.88146 | 163.80373 | 2.65069 |
| 175.7233 | 2.307 | 94.50033 | 2.98949 | 72.84605 |

As can be understood from the data of Table 8, the zoom ratio of the zoom lens of Embodiment 3 is relatively high, about 26, and the f-number $F_{NO}$ is 1.57 at the wide-angle end, which is indicative of a relatively bright lens system.

The zoom lens of Embodiment 3 of the present invention satisfies Conditions (1)–(3) above as set forth in Table 9 below.

TABLE 9

| Condition No. | Condition | Value |
|---|---|---|
| (1) | $0.4 < (Rf_{G121} - Rr_{G122})/(Rf_{G121} + Rr_{G122}) < 4.5$ | 0.75306 |
| (2) | $1.0 < F_{G121, G122}/F_{G12} < 4.4$ | 3.92042 |
| (3) | $4.0 < F_{G12}/F_{G1} < 7.0$ | 5.24489 |

Additionally, the zoom lens of Embodiment 3 reduces the fluctuations in the angle of view (field angle) during focusing. More specifically, for an image height of 4.4 mm at the wide-angle end, the half-field angle with the zoom lens focused at infinity is 41.10° and with the zoom lens focused at a close focus of 600 mm is 40.96°. As can be understood from this data, the zoom lens of Embodiment 3 has relatively small variations in the angle of view (field angle) at the wide-angle end during focusing.

Figure 8A:
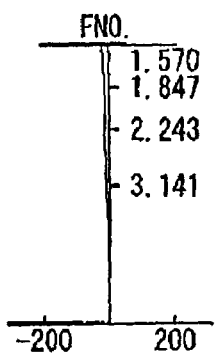
FIGS. 8A–8C show the spherical aberration, astigmatism, and distortion, respectively, of the zoom lens according to Embodiment 3 at the wide-angle end.
Figure 8B:
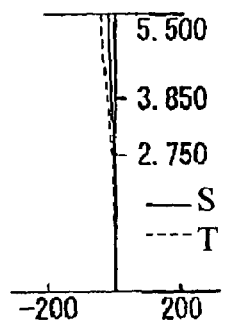
Figure 8C:
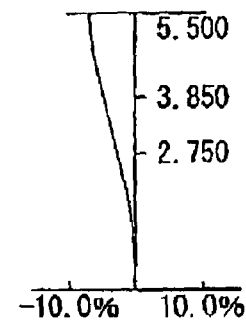
Figure 9A:
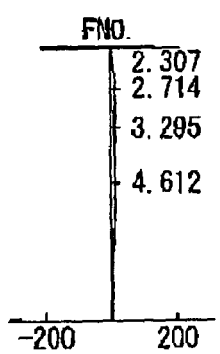
FIGS. 9A–9C show the spherical aberration, astigmatism, and distortion, respectively, of the zoom lens according to Embodiment 3 at the telephoto end.
Figure 9B:
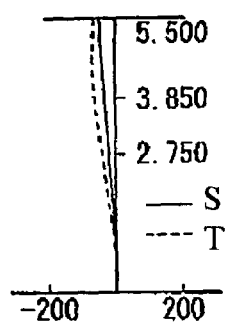
Figure 9C:
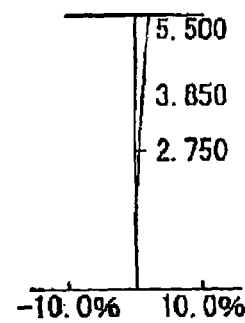

FIGS. 8A–8C show the spherical aberration, astigmatism, and distortion, respectively, of the zoom lens of Embodiment 3 at the wide-angle end. FIGS. 9A–9C show the spherical aberration, astigmatism, and distortion, respectively, of the zoom lens of Embodiment 3 at the telephoto end. The ordinate in FIGS. 8A and 9A is $F_{NO}$, whereas in FIGS. 8B, 8C, 9B and 9C, the ordinate is image height, in mm. In the figures, the aberrations are shown for a wavelength of 546.1 nm (the e-line). In FIGS. 8B and 9B, the astigmatism is shown for the sagittal image surface S and the tangential image surface T. As is apparent from these figures, the various aberrations of Embodiment 3 are favorably corrected over the entire range of zoom.

EMBODIMENT 4

Embodiment 4 is very similar to Embodiment 1 and therefore is well represented by FIG. 1. However, Embodiment 4 is even more similar to Embodiment 7, which is shown in FIG. 3, and which will be described last among Embodiments 1–7. Table 10 below lists, in order from the object side, the lens group, the lens subgroup (when appropriate), the surface number #, the radius of curvature R (in mm) of each surface, the on-axis surface spacing D (in mm), as well as the refractive index $N_d$ and the Abbe number $v_d$ (both at the d-line of 587.6 nm) of each optical element of Embodiment 4, including the color separation optical system GC.

TABLE 10

| Group | Subgroup | # | R | D | $N_d$ | $v_d$ |
|---|---|---|---|---|---|---|
| G1 | G11 | 1 | 392.150 | 4.302 | 1.70768 | 56.1 |
| | | 2 | 107.136 | 32.892 | | |
| | | 3 | −948.880 | 4.102 | 1.74392 | 53.6 |
| | | 4 | 1201.850 | 11.161 | | |
| | | 5 | −302.265 | 3.801 | 1.74677 | 53.3 |
| | | 6 | 315.573 | 1.000 | | |
| | | 7 | 238.234 | 13.464 | 1.80518 | 25.4 |
| | | 8 | 4262.155 | 2.242 | | |
| | G12 | 9 | 4518.562 | 3.601 | 1.80518 | 25.4 |
| | | 10 | 448.463 | 0.714 | | |
| | | 11 | 489.201 | 22.512 | 1.43875 | 95.0 |
| | | 12 | −182.733 | 0.120 | | |
| | | 13 | −501.940 | 8.123 | 1.43875 | 95.0 |
| | | 14 | −419.093 | 34.541 | | |
| | G13 | 15 | 274.814 | 18.750 | 1.43387 | 95.1 |
| | | 16 | −333.425 | 0.121 | | |
| | | 17 | 199.992 | 3.801 | 1.77390 | 27.4 |
| | | 18 | 128.805 | 1.156 | | |
| | | 19 | 134.621 | 25.544 | 1.43387 | 95.1 |
| | | 20 | −534.949 | 0.120 | | |
| | | 21 | 219.692 | 14.442 | 1.49700 | 81.6 |
| | | 22 | −1283.075 | 0.120 | | |
| | | 23 | 146.925 | 8.822 | 1.49700 | 81.6 |
| | | 24 | 274.713 | D24 (variable) | | |
| G2 | | 25 | 102.973 | 2.000 | 1.74100 | 52.7 |
| | | 26 | 43.232 | 8.411 | | |
| | | 27 | −74.985 | 2.003 | 1.71300 | 53.9 |
| | | 28 | 298.042 | 3.853 | | |
| | | 29 | −74.694 | 2.006 | 1.71300 | 53.9 |
| | | 30 | 75.517 | 9.497 | 1.80518 | 25.4 |
| | | 31 | −54.622 | 2.002 | 1.80400 | 46.6 |
| | | 32 | 507.842 | D32 (variable) | | |
| G3 | | 33 | 9763.550 | 4.983 | 1.43875 | 95.0 |
| | | 34 | −133.252 | 0.120 | | |
| | | 35 | 444.263 | 5.584 | 1.43875 | 95.0 |
| | | 36 | −156.465 | 0.120 | | |
| | | 37 | 203.833 | 2.000 | 1.84666 | 23.8 |
| | | 38 | 82.812 | 10.491 | 1.49700 | 81.6 |
| | | 39 | −152.952 | 0.120 | | |
| | | 40 | 91.784 | 7.319 | 1.49700 | 81.6 |
| | | 41 | −494.204 | D41 (variable) | | |
| | | 42 | ∞ (stop) | 7.101 | | |

TABLE 10-continued

| Group | Subgroup | # | R | D | $N_d$ | $v_d$ |
|---|---|---|---|---|---|---|
| G4 | | 43 | −58.656 | 2.004 | 1.72916 | 54.7 |
| | | 44 | 33.508 | 6.614 | 1.80518 | 25.4 |
| | | 45 | −128.180 | 1.872 | | |
| | | 46 | −44.543 | 3.967 | 1.80518 | 25.4 |
| | | 47 | −32.164 | 4.768 | 1.80400 | 46.6 |
| | | 48 | 206.534 | 3.359 | | |
| | | 49 | −107.883 | 13.947 | 1.71700 | 47.9 |
| | | 50 | −44.726 | 8.024 | | |
| | | 51 | 296.916 | 5.397 | 1.88300 | 40.8 |
| | | 52 | 75.486 | 0.121 | | |
| | | 53 | 54.479 | 9.119 | 1.48749 | 70.2 |
| | | 54 | −71.095 | 0.277 | | |
| | | 55 | 98.058 | 5.549 | 1.80809 | 22.8 |
| | | 56 | 31.974 | 8.310 | 1.49700 | 81.6 |
| | | 57 | −88.725 | 0.121 | | |
| | | 58 | 69.333 | 8.769 | 1.48749 | 70.2 |
| | | 59 | 893.344 | 0.0000 | | |
| GC | | 60 | ∞ | 33.0000 | 1.60859 | 46.5 |
| | | 61 | ∞ | 13.2000 | 1.51633 | 64.1 |
| | | 62 | ∞ | 22.034 | | |

In the zoom lens of Embodiment 4, both the second lens group G2 and the third lens group G3 move during zooming. Therefore, the on-axis spacings D24, D32, and D41 change with zooming. With zooming, the focal length f and the f-number $F_{NO}$ also change. Table 11 below lists the values of the focal length f (in mm), the f-number $F_{NO}$, and the variables D24, D32, and D41 (in mm) at the wide-angle end (f=6.77373 mm) and at the telephoto end (f=175.5963 mm) when the zoom lens is focused at infinity.

TABLE 11

| f | $F_{NO}$ | D24 | D32 | D41 |
|---|---|---|---|---|
| 6.77373 | 1.57000 | 3.8904 | 165.54272 | 2.64069 |
| 175.5963 | 2.309 | 99.00879 | 2.16585 | 70.90681 |

As can be understood from the data of Table 11, the zoom ratio of the zoom lens of Embodiment 4 is relatively high, about 26, and the f-number $F_{NO}$ is 1.57 at the wide-angle end, which is indicative of a relatively bright lens system.

The zoom lens of Embodiment 4 of the present invention satisfies Conditions (1)–(3) above as set forth in Table 12 below.

TABLE 12

| Condition No. | Condition | Value |
|---|---|---|
| (1) | $0.4 < (Rf_{G121} − Rr_{G122})/(Rf_{G121} + Rr_{G122}) < 4.5$ | 1.08429 |
| (2) | $1.0 < F_{G121, G122}/F_{G12} < 4.4$ | 1.09933 |
| (3) | $4.0 < F_{G12}/F_{G1} < 7.0$ | 5.68869 |

Additionally, the zoom lens of Embodiment 4 reduces the fluctuations in the angle of view (field angle) during focusing. More specifically, for an image height of 4.4 mill at the wide-angle end, the half-field angle with the zoom lens focused at infinity is 41.06° and with the zoom lens focused at a close focus of 600 mm is 40.79°. As can be understood from this data, the zoom lens of Embodiment 4 has relatively small variations in the angle of view (field angle) at the wide-angle end during focusing.

Figure 10A:
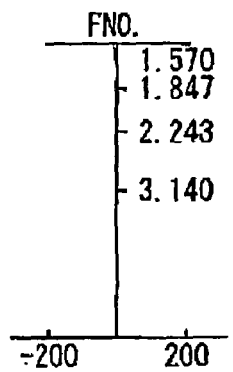
FIGS. 10A–10C show the spherical aberration, astigmatism, and distortion, respectively, of the zoom lens according to Embodiment 4 at the wide-angle end.
Figure 10B:
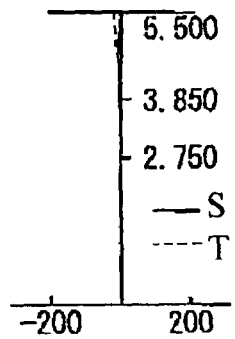
Figure 10C:
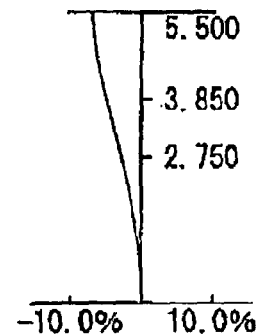
Figure 11A:
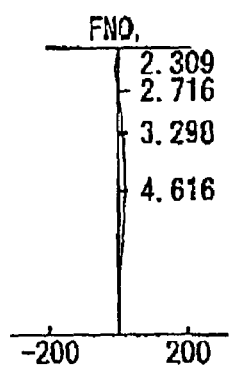
FIGS. 11A–11C show the spherical aberration, astigmatism, and distortion, respectively, of the zoom lens according to Embodiment 4 at the telephoto end.
Figure 11B:
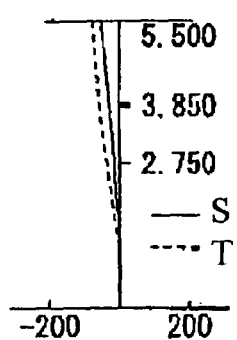
Figure 11C:
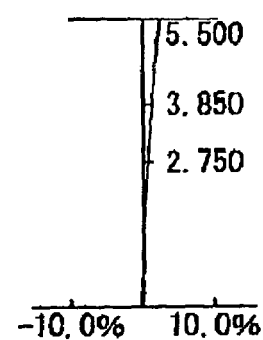

FIGS. 10A–10C show the spherical aberration, astigmatism, and distortion, respectively, of the zoom lens of Embodiment 4 at the wide-angle end. FIGS. 11A–11C show the spherical aberration, astigmatism, and distortion, respectively, of the zoom lens of Embodiment 4 at the telephoto end. The ordinate in FIGS. 10A and 11A is $F_{NO}$, whereas in FIGS. 10B, 10C, 11B and 11C, the ordinate is image height, in mm. In the figures, the aberrations are shown for a wavelength of 546.1 nm (the e-line). In FIGS. 10B and 11B, the astigmatism is shown for the sagittal image surface S and the tangential image surface T. As is apparent from these figures, the various aberrations of Embodiment 4 are favorably corrected over the entire range of zoom.

EMBODIMENT 5

Embodiment 5 is very similar to Embodiment 1 and therefore is well represented by FIG. 1. Table 13 below lists, in order from the object side, the lens group, the lens subgroup (when appropriate), the surface number #, the radius of curvature R (in mm) of each surface, the on-axis surface spacing D (in mm), as well as the refractive index $N_d$ and the Abbe number $v_d$ (both at the d-line of 587.6 nm) of each optical element of Embodiment 5, including the color separation optical system GC.

TABLE 13

| Group | Subgroup | # | R | D | $N_d$ | $v_d$ |
|---|---|---|---|---|---|---|
| G1 | G11 | 1 | 648.381 | 4.300 | 1.72572 | 55.2 |
| | | 2 | 108.999 | 33.402 | | |
| | | 3 | −635.382 | 4.100 | 1.72900 | 55.0 |
| | | 4 | 1706.847 | 11.666 | | |
| | | 5 | −271.842 | 3.800 | 1.71633 | 55.7 |
| | | 6 | 579.442 | 1.000 | | |
| | | 7 | 288.559 | 14.117 | 1.80518 | 25.4 |
| | | 8 | −1353.919 | 2.239 | | |
| | G12 | 9 | −1518.335 | 3.600 | 1.80518 | 25.4 |
| | | 10 | 614.530 | 1.701 | | |
| | | 11 | 958.971 | 21.241 | 1.43875 | 95.0 |
| | | 12 | −180.182 | 0.120 | | |
| | | 13 | 1282.195 | 9.695 | 1.43875 | 95.0 |
| | | 14 | −445.816 | 33.116 | | |
| | G13 | 15 | 228.244 | 17.893 | 1.43387 | 95.1 |
| | | 16 | −538.652 | 0.120 | | |
| | | 17 | 255.309 | 3.800 | 1.70325 | 31.7 |
| | | 18 | 126.623 | 1.387 | | |
| | | 19 | 133.231 | 25.187 | 1.43387 | 95.1 |
| | | 20 | −524.237 | 0.120 | | |
| | | 21 | 254.490 | 13.808 | 1.49700 | 81.6 |
| | | 22 | −739.542 | 0.120 | | |
| | | 23 | 123.736 | 8.219 | 1.49700 | 81.6 |
| | | 24 | 191.537 | D24 (variable) | | |
| G2 | | 25 | 106.690 | 2.000 | 1.74100 | 52.7 |
| | | 26 | 42.413 | 8.173 | | |
| | | 27 | −79.293 | 2.000 | 1.71300 | 53.9 |
| | | 28 | 237.397 | 3.815 | | |
| | | 29 | −82.533 | 2.000 | 1.71300 | 53.9 |
| | | 30 | 84.713 | 9.407 | 1.80518 | 25.4 |
| | | 31 | −51.341 | 2.000 | 1.80400 | 46.6 |
| | | 32 | 626.802 | D32 (variable) | | |
| G3 | | 33 | 4286.374 | 4.615 | 1.43875 | 95.0 |
| | | 34 | −145.750 | 0.120 | | |
| | | 35 | 395.171 | 5.253 | 1.43875 | 95.0 |
| | | 36 | −174.447 | 0.120 | | |
| | | 37 | 181.985 | 2.000 | 1.84666 | 23.8 |
| | | 38 | 80.353 | 10.308 | 1.49700 | 81.6 |
| | | 39 | −159.387 | 0.120 | | |
| | | 40 | 92.016 | 7.130 | 1.49700 | 81.6 |
| | | 41 | −516.589 | D41 (variable) | | |
| | | 42 | ∞ (stop) | 7.102 | | |
| G4 | | 43 | −57.956 | 2.000 | 1.72916 | 54.7 |
| | | 44 | 34.410 | 6.639 | 1.80518 | 25.4 |
| | | 45 | −138.394 | 1.899 | | |
| | | 46 | −44.950 | 3.962 | 1.80518 | 25.4 |
| | | 47 | −32.627 | 4.745 | 1.80400 | 46.6 |
| | | 48 | 228.236 | 3.355 | | |
| | | 49 | −109.209 | 13.968 | 1.71700 | 47.9 |

TABLE 13-continued

| Group | Subgroup | # | R | D | $N_d$ | $v_d$ |
|---|---|---|---|---|---|---|
| | | 50 | −44.661 | 7.981 | | |
| | | 51 | 262.863 | 5.378 | 1.88300 | 40.8 |
| | | 52 | 76.659 | 0.124 | | |
| | | 53 | 55.825 | 9.097 | 1.48749 | 70.2 |
| | | 54 | −72.266 | 0.251 | | |
| | | 55 | 96.883 | 5.550 | 1.80809 | 22.8 |
| | | 56 | 32.158 | 8.348 | 1.49700 | 81.6 |
| | | 57 | −92.976 | 0.121 | | |
| | | 58 | 68.140 | 8.838 | 1.48749 | 70.2 |
| | | 59 | 688.662 | 0.0000 | | |
| GC | | 60 | ∞ | 33.0000 | 1.60859 | 46.5 |
| | | 61 | ∞ | 13.2000 | 1.51633 | 64.1 |
| | | 62 | ∞ | 21.959 | | |

In the zoom lens of Embodiment 5, both the second lens group G2 and the third lens group G3 move during zooming. Therefore, the on-axis spacings D24, D32, and D41 change with zooming. With zooming, the focal length f and the f-number $F_{NO}$ also change. Table 14 below lists the values of the focal length f (in mm), the f-number $F_{NO}$, and the variables D24, D32, and D41 (in mm) at the wide-angle end (f=6.77461 mm) and at the telephoto end (f=175.6784 mm) when the zoom lens is focused at infinity.

TABLE 14

| f | $F_{NO}$ | D24 | D32 | D41 |
|---|---|---|---|---|
| 6.77461 | 1.57000 | 3.88136 | 167.68175 | 2.63908 |
| 175.6784 | 2.305 | 100.2665 | 2.13857 | 71.79713 |

As can be understood from the data of Table 14, the zoom ratio of the zoom lens of Embodiment 5 is relatively high, about 26, and the f-number $F_{NO}$ is 1.57 at the wide-angle end, which is indicative of a relatively bright lens system.

The zoom lens of Embodiment 5 of the present invention satisfies Conditions (1)–(3) above as set forth in Table 15 below.

TABLE 15

| Condition No. | Condition | Value |
|---|---|---|
| (1) | $0.4 < (Rf_{G121} - Rr_{G122})/(Rf_{G121} + Rr_{G122}) < 4.5$ | 0.78784 |
| (2) | $1.0 < F_{G121, G122}/F_{G12} < 4.4$ | 2.21272 |
| (3) | $4.0 < F_{G12}/F_{G1} < 7.0$ | 4.26816 |

Additionally, the zoom lens of Embodiment 5 reduces the fluctuations in the angle of view (field angle) during focusing. More specifically, for an image height of 4.4 mm at the wide-angle end, the half-field angle with the zoom lens focused at infinity is 41.08° and with the zoom lens focused at a close focus of 600 mm is 41.19°. As can be understood from this data, the zoom lens of Embodiment 5 has relatively small variations in the angle of view (field angle) at the wide-angle end during focusing.

Figure 12A:
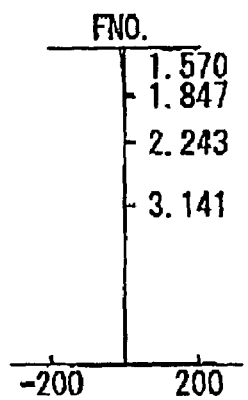
FIGS. 12A–12C show the spherical aberration, astigmatism, and distortion, respectively, of the zoom lens according to Embodiment 5 at the wide-angle end.
Figure 12B:
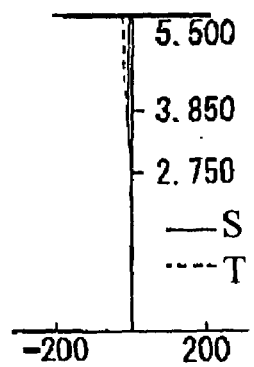
Figure 12C:
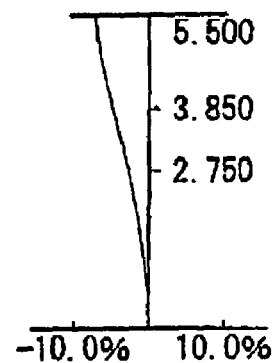
Figure 13A:
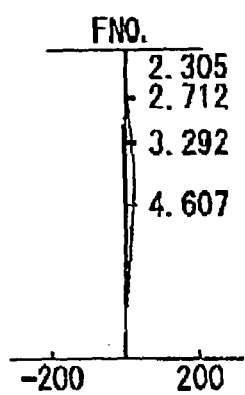
FIGS. 13A–13C show the spherical aberration, astigmatism, and distortion, respectively, of the zoom lens according to Embodiment 5 at the telephoto end.
Figure 13B:
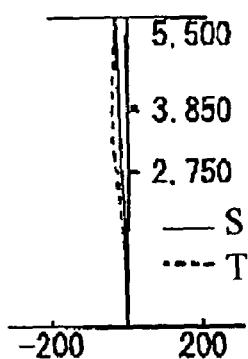
Figure 13C:
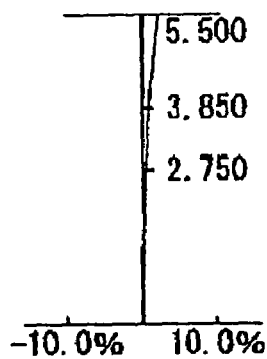

FIGS. 12A–12C show the spherical aberration, astigmatism, and distortion, respectively, of the zoom lens of Embodiment 5 at the wide-angle end. FIGS. 13A–13C show the spherical aberration, astigmatism, and distortion, respectively, of the zoom lens of Embodiment 5 at the telephoto end. The ordinate in FIGS. 12A and 13A is $F_{NO}$ whereas in FIGS. 12B, 12C, 13B and 13C, the ordinate is image height, in mm. In the figures, the aberrations are shown for a wavelength of 546.1 nm (the e-line). In FIGS. 12B and 13B, the astigmatism is shown for the sagittal image surface S and the tangential image surface T. As is apparent from these figures, the various aberrations of Embodiment 5 are favorably corrected over the entire range of zoom.

EMBODIMENT 6

Embodiment 6 is very similar to Embodiment 1 and therefore is well represented by FIG. 1. Table 16 below lists, in order from the object side, the lens group, the lens subgroup (when appropriate), the surface number #, the radius of curvature R (in mm) of each surface, the on-axis surface spacing D (in mm), as well as the refractive index $N_d$ and the Abbe number $v_d$ (both at the d-line of 587.6 nm) of each optical element of Embodiment 6, including the color separation optical system GC.

TABLE 16

| Group | Subgroup | # | R | D | $N_d$ | $v_d$ |
|---|---|---|---|---|---|---|
| G1 | G11 | 1 | 409.796 | 4.300 | 1.79992 | 48.0 |
| | | 2 | 122.553 | 33.096 | | |
| | | 3 | −511.127 | 4.100 | 1.76947 | 51.1 |
| | | 4 | 1053.577 | 11.504 | | |
| | | 5 | −308.931 | 3.800 | 1.79649 | 48.4 |
| | | 6 | 434.687 | 1.000 | | |
| | | 7 | 375.977 | 13.910 | 1.80518 | 25.4 |
| | | 8 | −622.082 | 2.241 | | |
| | G12 | 9 | −617.344 | 3.600 | 1.80518 | 25.4 |
| | | 10 | 1036.877 | 1.575 | | |
| | | 11 | 2414.592 | 20.526 | 1.43875 | 95.0 |
| | | 12 | −168.238 | 0.120 | | |
| | | 13 | 3861.755 | 8.503 | 1.43875 | 95.0 |
| | | 14 | −516.264 | 35.496 | | |
| | G13 | 15 | 274.896 | 19.030 | 1.43387 | 95.1 |
| | | 16 | −355.466 | 0.120 | | |
| | | 17 | 213.309 | 3.800 | 1.77183 | 26.5 |
| | | 18 | 142.283 | 1.195 | | |
| | | 19 | 150.326 | 26.279 | 1.43387 | 95.1 |
| | | 20 | −384.117 | 0.120 | | |
| | | 21 | 182.792 | 14.778 | 1.49700 | 81.6 |
| | | 22 | 9029.022 | 0.120 | | |
| | | 23 | 136.194 | 9.880 | 1.49700 | 81.6 |
| | | 24 | 268.048 | D24 (variable) | | |
| G2 | | 25 | 108.443 | 2.000 | 1.74100 | 52.7 |
| | | 26 | 42.922 | 8.619 | | |
| | | 27 | −74.704 | 2.000 | 1.71300 | 53.9 |
| | | 28 | 175.582 | 4.474 | | |
| | | 29 | −71.629 | 2.000 | 1.71300 | 53.9 |
| | | 30 | 81.374 | 10.061 | 1.80518 | 25.4 |
| | | 31 | −48.107 | 2.000 | 1.80400 | 46.6 |
| | | 32 | 1054.696 | D32 (variable) | | |
| G3 | | 33 | 1635.863 | 4.848 | 1.43875 | 95.0 |
| | | 34 | −152.765 | 0.120 | | |
| | | 35 | 467.539 | 5.496 | 1.43875 | 95.0 |
| | | 36 | −166.315 | 0.120 | | |
| | | 37 | 169.723 | 2.000 | 1.84666 | 23.8 |
| | | 38 | 78.225 | 10.744 | 1.49700 | 81.6 |
| | | 39 | −180.843 | 0.120 | | |
| | | 40 | 117.495 | 6.811 | 1.49700 | 81.6 |
| | | 41 | 337.820 | D41 (variable) | | |
| | | 42 | ∞ (stop) | 7.102 | | |
| G4 | | 43 | −60.130 | 2.004 | 1.72916 | 54.7 |
| | | 44 | 33.540 | 6.706 | 1.80518 | 25.4 |
| | | 45 | −105.927 | 1.930 | | |
| | | 46 | −44.792 | 3.824 | 1.80518 | 25.4 |
| | | 47 | −31.922 | 4.687 | 1.80400 | 46.6 |
| | | 48 | 279.359 | 3.416 | | |
| | | 49 | −117.201 | 13.752 | 1.71700 | 47.9 |
| | | 50 | −48.243 | 8.230 | | |
| | | 51 | 232.405 | 5.385 | 1.88300 | 40.8 |
| | | 52 | 86.660 | 0.205 | | |
| | | 53 | 54.773 | 9.151 | 1.48749 | 70.2 |
| | | 54 | −81.478 | 0.384 | | |
| | | 55 | 131.720 | 5.371 | 1.80809 | 22.8 |
| | | 56 | 30.842 | 8.335 | 1.49700 | 81.6 |
| | | 57 | −86.696 | 0.131 | | |

TABLE 16-continued

| Group | Subgroup | # | R | D | $N_d$ | $v_d$ |
|---|---|---|---|---|---|---|
|  |  | 58 | 64.297 | 8.732 | 1.48749 | 70.2 |
|  |  | 59 | −6927.701 | 0.0000 |  |  |
| GC |  | 60 | ∞ | 33.0000 | 1.60859 | 46.5 |
|  |  | 61 | ∞ | 13.2000 | 1.51633 | 64.1 |
|  |  | 62 | ∞ | 22.021 |  |  |

In the zoom lens of Embodiment 6 both the second lens group G2 and the third lens group G3 move during zooming. Therefore, the on-axis spacings D24, D32, and D41 change with zooming. With zooming, the focal length f and the f-number $F_{NO}$ also change. Table 17 below lists the values of the focal length f (in mm), the f-number $F_{NO}$, and the variables D24, D32, and D41 (in mm) at the wide-angle end (f=6.77330 mm) and at the telephoto end (f=175.6176 mm) when the zoom lens is focused at infinity.

TABLE 17

| f | $F_{NO}$ | D24 | D32 | D41 |
|---|---|---|---|---|
| 6.77330 | 1.57000 | 3.88241 | 160.41129 | 3.18156 |
| 175.6176 | 2.305 | 85.23947 | 1.8615 | 80.37429 |

As can be understood from the data of Table 17, the zoom ratio of the zoom lens of Embodiment 6 is relatively high, about 26, and the f-number $F_{NO}$ is 1.57 at the wide-angle end, which is indicative of a relatively bright lens system.

The zoom lens of Embodiment 6 of the present invention satisfies Conditions (1)–(3) above as set forth in Table 18 below.

TABLE 18

| Condition No. | Condition | Value |
|---|---|---|
| (1) | $0.4 < (Rf_{G121} - Rr_{G122})/(Rf_{G121} + Rr_{G122}) < 4.5$ | 0.57169 |
| (2) | $1.0 < F_{G121, G122}/F_{G12} < 4.4$ | 2.24775 |
| (3) | $4.0 < F_{G12}/F_{G1} < 7.0$ | 6.77827 |

Additionally, the zoom lens of Embodiment 6 reduces the fluctuations in the angle of view (field angle) during focusing. More specifically, for an image height of 4.4 mm at the wide-angle end, the half-field angle with the zoom lens focused at infinity is 41.11° and with the zoom lens focused at a close focus of 600 mm is 40.81°. As can be understood from this data, the zoom lens of Embodiment 6 has relatively small variations in the angle of view (field angle) at the wide-angle end during focusing.

Figure 14A:
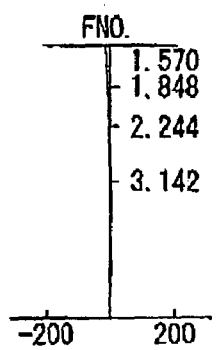
FIGS. 14A–14C show the spherical aberration, astigmatism, and distortion, respectively, of the zoom lens according to Embodiment 6 at the wide-angle end.
Figure 14B:
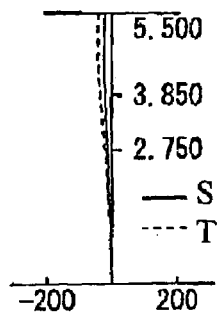
Figure 14C:
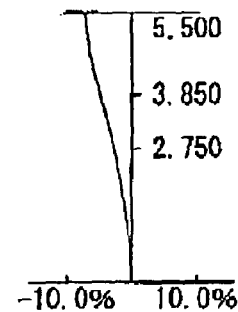
Figure 15A:
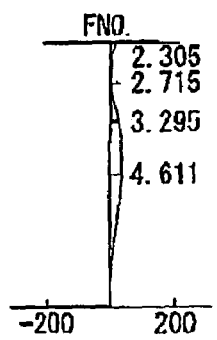
FIGS. 15A–15C show the spherical aberration, astigmatism, and distortion, respectively, of the zoom lens according to Embodiment 6 at the telephoto end.
Figure 15B:
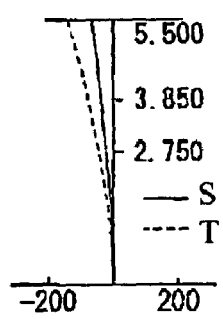
Figure 15C:
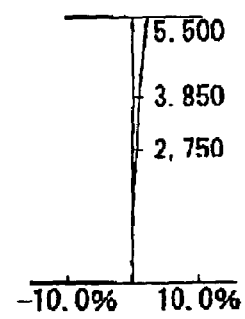

FIGS. 14A–14C show the spherical aberration, astigmatism, and distortion, respectively, of the zoom lens of Embodiment 6 at the wide-angle end. FIGS. 15A–15C show the spherical aberration, astigmatism, and distortion, respectively, of the zoom lens of Embodiment 6 at the telephoto end. The ordinate in FIGS. 14A and 15A is $F_{NO}$, whereas in FIGS. 14B, 14C, 15B and 15C, the ordinate is image height, in mm. In the figures, the aberrations are shown for a wavelength of 546.1 nm (the e-line). In FIGS. 14B and 15B, the astigmatism is shown for the sagittal image surface S and the tangential image surface T. As is apparent from these figures, the various aberrations of Embodiment 6 are favorably corrected over the entire range of zoom.

EMBODIMENT 7

Embodiment 7 is very similar to Embodiment 1 and therefore only the differences between Embodiment 7 and Embodiment 1 will be explained. In Embodiment 7, which is well-shown by FIG. 3, instead of the lens element G121 being a meniscus lens element with its convex surface on the image side as in Embodiment 1, the lens element G121 is a meniscus lens element with its convex surface on the object side. Also, instead of the lens element 122 being a meniscus lens element as in Embodiment 1, the lens element G122 of Embodiment 7 is a biconvex lens element. Finally, whereas in Embodiment 1 the lens element G123 is biconvex, in Embodiment 7 the lens element G123 has a meniscus shape with its convex surface on the image side. Table 19 below lists, in order from the object side, the lens group, the lens subgroup (when appropriate), the surface number #, the radius of curvature R (in mm) of each surface, the on-axis surface spacing D (in mm), as well as the refractive index $N_d$ and the Abbe number $v_d$ (both at the d-line of 587.6 nm) of each optical element of Embodiment 7, including the color separation

TABLE 19

| Group | Subgroup | # | R | D | $N_d$ | $v_d$ |
|---|---|---|---|---|---|---|
| G1 | G11 | 1 | 488.767 | 4.300 | 1.76544 | 51.5 |
|  |  | 2 | 110.546 | 33.715 |  |  |
|  |  | 3 | −634.675 | 4.100 | 1.74015 | 54.0 |
|  |  | 4 | 841.341 | 12.008 |  |  |
|  |  | 5 | −316.814 | 3.800 | 1.73109 | 54.9 |
|  |  | 6 | 1575.737 | 1.000 |  |  |
|  |  | 7 | 279.511 | 13.944 | 1.80518 | 25.4 |
|  |  | 8 | 2639.822 | 2.254 |  |  |
|  | G12 | 9 | 612.711 | 3.601 | 1.80518 | 25.4 |
|  |  | 10 | 236.057 | 1.994 |  |  |
|  |  | 11 | 238.876 | 21.185 | 1.43875 | 95.0 |
|  |  | 12 | −367.626 | 0.120 |  |  |
|  |  | 13 | −1548.985 | 9.116 | 1.43875 | 95.0 |
|  |  | 14 | −303.229 | 33.813 |  |  |
|  | G13 | 15 | 340.221 | 18.883 | 1.43387 | 95.1 |
|  |  | 16 | −268.751 | 0.120 |  |  |
|  |  | 17 | 217.264 | 3.800 | 1.65558 | 35.5 |
|  |  | 18 | 121.541 | 0.905 |  |  |
|  |  | 19 | 125.893 | 25.200 | 1.43387 | 95.1 |
|  |  | 20 | −728.956 | 0.120 |  |  |
|  |  | 21 | 191.492 | 13.924 | 1.49700 | 81.6 |
|  |  | 22 | −10575.074 | 0.120 |  |  |
|  |  | 23 | 126.042 | 8.619 | 1.49700 | 81.6 |
|  |  | 24 | 206.431 | D24 (variable) |  |  |
| G2 |  | 25 | 101.557 | 2.001 | 1.74100 | 52.7 |
|  |  | 26 | 40.887 | 8.612 |  |  |
|  |  | 27 | −73.765 | 2.002 | 1.71300 | 53.9 |
|  |  | 28 | 373.636 | 3.751 |  |  |
|  |  | 29 | −74.246 | 2.000 | 1.71300 | 53.9 |
|  |  | 30 | 80.696 | 9.463 | 1.80518 | 25.4 |
|  |  | 31 | −50.430 | 2.000 | 1.80400 | 46.6 |
|  |  | 32 | 614.238 | D32 (variable) |  |  |
| G3 |  | 33 | 3116.791 | 4.759 | 1.43875 | 95.0 |
|  |  | 34 | −143.020 | 0.120 |  |  |
|  |  | 35 | 424.673 | 5.395 | 1.43875 | 95.0 |
|  |  | 36 | −165.266 | 0.120 |  |  |
|  |  | 37 | 202.403 | 2.000 | 1.84666 | 23.8 |
|  |  | 38 | 84.183 | 10.054 | 1.49700 | 81.6 |
|  |  | 39 | −167.050 | 0.120 |  |  |
|  |  | 40 | 97.430 | 6.864 | 1.49700 | 81.6 |
|  |  | 41 | −531.773 | D41 (variable) |  |  |
|  |  | 42 | ∞ (stop) | 7.008 |  |  |
| G4 |  | 43 | −61.798 | 2.008 | 1.72916 | 54.7 |
|  |  | 44 | 33.228 | 6.698 | 1.80518 | 25.4 |
|  |  | 45 | −118.848 | 1.788 |  |  |
|  |  | 46 | −45.186 | 3.873 | 1.80518 | 25.4 |
|  |  | 47 | −31.872 | 4.768 | 1.80400 | 46.6 |
|  |  | 48 | 224.705 | 3.437 |  |  |
|  |  | 49 | −111.410 | 13.869 | 1.71700 | 47.9 |

TABLE 19-continued

| Group | Subgroup | # | R | D | $N_d$ | $v_d$ |
|---|---|---|---|---|---|---|
| | | 50 | −46.379 | 8.216 | | |
| | | 51 | 261.446 | 5.440 | 1.88300 | 40.8 |
| | | 52 | 85.857 | 0.175 | | |
| | | 53 | 54.652 | 9.175 | 1.48749 | 70.2 |
| | | 54 | −80.747 | 0.359 | | |
| | | 55 | 121.140 | 5.435 | 1.80809 | 22.8 |
| | | 56 | 31.303 | 8.270 | 1.49700 | 81.6 |
| | | 57 | −89.820 | 0.120 | | |
| | | 58 | 63.024 | 8.686 | 1.48749 | 70.2 |
| | | 59 | 8584.213 | 0.0000 | | |
| GC | | 60 | ∞ | 33.0000 | 1.60859 | 46.5 |
| | | 61 | ∞ | 13.2000 | 1.51633 | 64.1 |
| | | 62 | ∞ | 21.974 | | |

In the zoom lens of Embodiment 7, both the second lens group G2 and the third lens group G3 move during zooming. Therefore, the on-axis spacings D24, D32, and D41 change with zooming. With zooming, the focal length f and the f-number $F_{NO}$ also change. Table 20 below lists the values of the focal length f (in mm), the f-number $F_{NO}$ and the variables D24, D32, and D41 (in mm) at the wide-angle end (f=6.77711 mm) and at the telephoto end (f=175.7309 mm) when the zoom lens is focused at infinity.

TABLE 20

| f | $F_{NO}$ | D24 | D32 | D41 |
|---|---|---|---|---|
| 6.77711 | 1.57000 | 3.88024 | 165.61290 | 2.63466 |
| 175.7309 | 2.305 | 93.09877 | 2.64343 | 76.3856 |

As can be understood from the data of Table 20, the zoom ratio of the zoom lens of Embodiment 7 is relatively high, about 26, and the f-number $F_{NO}$ is 1.57 at the wide-angle end, which is indicative of a relatively bright lens system.

The zoom lens of Embodiment 7 of the present invention satisfies Conditions (1)–(3) above as set forth in Table 21 below.

TABLE 21

| Condition No. | Condition | Value |
|---|---|---|
| (1) | $0.4 < (Rf_{G121} - Rr_{G122})/(Rf_{G121} + Rr_{G122}) < 4.5$ | 4.00000 |
| (2) | $1.0 < F_{G121, G122}/F_{G12} < 4.4$ | 2.22300 |
| (3) | $4.0 < F_{G12}/F_{G1} < 7.0$ | 5.24581 |

Additionally, the zoom lens of Embodiment 7 reduces the fluctuations in the angle of view (field angle) during focusing. More specifically, for an image height of 4.4 mm at the wide-angle end, the half-field angle with the zoom lens focused at infinity is 41.10° and with the zoom lens focused at a close focus of 600 mm is 40.80°. As can be understood from this data, the zoom lens of Embodiment 7 has relatively small variations in the angle of view (field angle) at the wide-angle end during focusing.

Figure 16A:
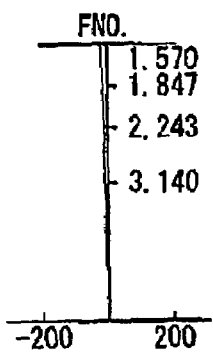
FIGS. 16A–16C show the spherical aberration, astigmatism, and distortion, respectively, of the zoom lens according to Embodiment 7 at the wide-angle end.
Figure 16B:
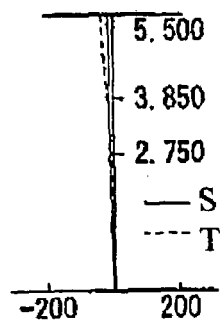
Figure 16C:
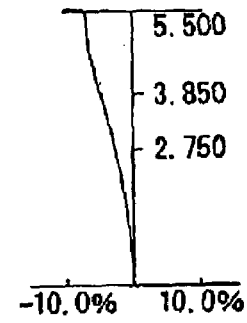
Figure 17A:
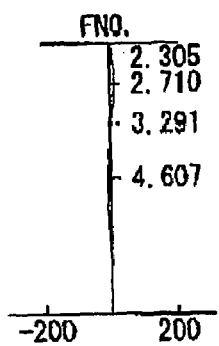
FIGS. 17A–17C show the spherical aberration, astigmatism, and distortion, respectively, of the zoom lens according to Embodiment 7 at the telephoto end.
Figure 17B:
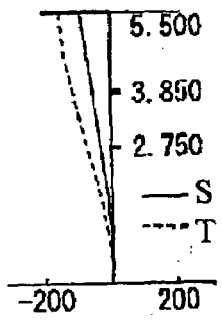
Figure 17C:
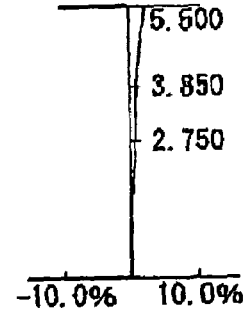

FIGS. 16A–16C show the spherical aberration, astigmatism, and distortion, respectively, of the zoom lens of Embodiment 7 at the wide-angle end. FIGS. 17A–17C show the spherical aberration, astigmatism, and distortion, respectively, of the zoom lens of Embodiment 7 at the telephoto end. The ordinate in FIGS. 16A and 17A is $F_{NO}$, whereas in FIGS. 16B, 16C, 17B and 17C, the ordinate is image height, in mm. In the Figures, the aberrations are shown for a wavelength of 546.1 nm (the e-line). In FIGS. 16B and 17B, the astigmatism is shown for the sagittal image surface S and the tangential image surface T. As is apparent from these figures, the various aberrations of Embodiment 7 are favorably corrected over the entire range of zoom.

As can be understood from the numerical data of the tables above and FIGS. 1–17C, including FIGS. 4A–17C that illustrate aberrations, each of Embodiments 1–7 provides a highly efficient zoom lens that is relatively small, that minimizes fluctuations in the angle of view (field angle) during focusing, and that favorably corrects various aberrations.

The present invention is not limited to the aforementioned embodiments, as it will be obvious that various alternative implementations are possible. For instance, values such as the radius of curvature R of each of the lens components, the surface spacings D, the refractive index $N_d$, as well as the Abbe number $v_d$, are not limited to the examples indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens having an object side and an image side and comprising four lens groups, arranged in order from the object side of the zoom lens along an optical axis, as follows:
   a first lens group having positive refractive power;
   a second lens group having negative refractive power;
   a third lens group; and
   a fourth lens group having positive refractive power;
wherein
   the first lens group and the fourth lens group do not move during zooming;
   the second lens group and the third lens group are moved along the optical axis during zooming;
   the first lens group includes, arranged in order from the object side of the zoom lens along the optical axis, a first lens subgroup having negative refractive power that does not move during focusing of the zoom lens, a second lens subgroup having positive refractive power that moves during focusing of the zoom lens, and a third lens subgroup having positive refractive power that does not move during focusing of the zoom lens; and
   the second lens subgroup includes, arranged in order from the object side of the zoom lens along the optical axis, a first lens element having negative refractive power, a second lens element having positive refractive power, and a third lens element having positive refractive power.

2. The zoom lens of claim 1, wherein the first lens group includes only three lens subgroups.

3. The zoom lens of claim 2, wherein the first lens subgroup includes only three lens elements.

4. The zoom lens of claim 1, wherein the zoom lens includes only four lens groups.

5. The zoom lens of claim 4, wherein the first lens group includes only three lens subgroups.

6. The zoom lens of claim 5, wherein the first lens subgroup includes only three lens elements.

7. The zoom lens of claim 4, wherein the following condition is satisfied:

$$0.4 < (Rf_{G121} - Rr_{G122})/(Rf_{G121} + Rr_{G122}) < 4.5$$

where
$Rf_{G121}$ is the radius of curvature of the lens surface on the object side of the first lens element, and
$Rr_{G122}$ is the radius of curvature of the lens surface on the image side of the second lends element.

8. The zoom lens of claim 7, wherein the following condition is satisfied:

$$1.0 < F_{G121, G122}/F_{G12} < 4.4$$

where
$F_{G12}$ is the focal length of the second lens subgroup, and
$F_{G121, G122}$ is the composite focal length of the first lends element and the second lends element.

9. The zoom lens of claim 8, wherein the following condition is satisfied:

$$4.0 < F_{G12}/F_{G1} < 7.0$$

where
$F_{G12}$ is the focal length of the second lens subgroup, and
$F_{G1}$ is the focal length of the first lens group.

10. The zoom lens of claim 7, wherein the following condition is satisfied:

$$4.0 < F_{G12}/F_{G1} < 7.0$$

where
$F_{G12}$ is the focal length of the second lens subgroup, and
$F_{G1}$ is the focal length of the first lens group.

11. The zoom lends of claim 4, wherein the following condition is satisfied:

$$1.0 < F_{G121, G122}/F_{G12} < 4.4$$

where
$F_{G12}$ is the focal length of the second lends subgroup, and
$F_{G121, G122}$ is the composite focal length of the first lends element and the second lens element.

12. The zoom lens of claim 11, wherein the following condition is satisfied:

$$4.0 < F_{G12}/F_{G1} < 7.0$$

where
$F_{G12}$ is the focal length of the second lens subgroups, and
$F_{G1}$ is the focal length of the first lens group.

13. The zoom lens of claim 4, wherein the following condition is satisfied:

$$4.0 < F_{G12}/F_{G1} < 7.0$$

where
$F_{G12}$ is the focal length of the second lens subgroup, and
$F_{G1}$ is the focal length of the first lens group.

14. The zoom lens of claim 1, wherein the following condition is satisfied:

$$0.4 < (Rf_{G121} - Rr_{G122})/(Rf_{G121} + Rr_{G122}) < 4.5$$

where
$Rf_{G121}$ is the radius of curvature of the lens surface on the object side of the first lens element, and
$Rr_{G122}$ is the radius of curvature of the lens surface on the image side of the second lens element.

15. The zoom lens of claim 14, wherein the following condition is satisfied:

$$1.0 < F_{G121, G122}/F_{G12} < 4.4$$

where
$F_{G12}$ is the focal length of the second lens subgroups, and
$F_{G121, G122}$ is the composite focal length of the first lens element and the second lens element.

16. The zoom lens of claim 15, wherein the following condition is satisfied:

$$4.0 < F_{G12}/F_{G1} < 7.0$$

where
$F_{G12}$ is the focal length of the second lens subgroup, and
$F_{G1}$ is the focal length of the first lens group.

17. The zoom lens of claim 14, wherein the following condition is satisfied:

$$4.0 < F_{G12}/F_{G1} < 7.0$$

where
$F_{G12}$ is the focal length of the second lens subgroup, and
$F_{G1}$ is the focal length of the first lens group.

18. The zoom lens of claim 1, wherein the following condition is satisfied:

$$1.0 < F_{G121, G122}/F_{G12} < 4.4$$

where
$F_{G12}$ is the focus length of the second lends subgroup, and
$F_{G121, G122}$ is the composite focal length of the first lends element and the second lends element.

19. The zoom lens of claim 18, wherein the following condition is satisfied:

$$4.0 < F_{G12}/F_{G1} < 7.0$$

where
$F_{G12}$ is the focal length of the second lens subgroup, and
$F_{G1}$ is the focal length of the first lens group.

20. The zoom lens of claim 1, wherein the following condition is satisfied:

$$4.0 < F_{G12}/F_{G1} < 7.0$$

where
$F_{G12}$ is the focal length of the second lends subgroup, and
$F_{G1}$ is the focal length of the first lens group.

* * * * *

UNITED STATES PATENT AND TRADEMARK OFFICE
CERTIFICATE OF CORRECTION

PATENT NO. : 7,085,069 B2 Page 1 of 1
APPLICATION NO. : 11/045349
DATED : August 1, 2006
INVENTOR(S) : Toyama It is certified that error appears in the above-identified patent and that said Letters Patent is hereby corrected as shown below:

Title page, Item (56), under "U.S. Patent Documents"
change "6,545,818 B1" to -- 6,545,818 B2 -- ;

Title page, Item (56), under "Other Publications"
delete "discussed at page 2 of spec; English Abstract attached.";

Col. 6, line 5
change "provide" to -- provides -- ;

Col. 7, line 56
change "fluxes it" to -- fluxes at -- ;

Col. 9, line 41
change "variable" to -- variables -- ;

Col. 15, line 58
change "mill" to -- mm -- ; and

Col. 17, line 55
change "of600 mm" to -- of 600 mm--.

Signed and Sealed this

Twenty-first Day of November, 2006

JON W. DUDAS
*Director of the United States Patent and Trademark Office*